(12) United States Patent
Beelman, III et al.

(10) Patent No.: US 9,789,916 B1
(45) Date of Patent: Oct. 17, 2017

(54) PNEUMATIC TANK TRAILER

(71) Applicant: Racehorse Investments, L.L.C., East St. Louis, IL (US)

(72) Inventors: Frank J. Beelman, III, Sunset Hills, MO (US); David Smith, Alpine, UT (US)

(73) Assignee: Racehorse Investments, L.L.C., East St. Louis, IL (US)

( * ) Notice: Subject to any disclaimer, the term of this patent is extended or adjusted under 35 U.S.C. 154(b) by 0 days.

(21) Appl. No.: 15/130,664

(22) Filed: Apr. 15, 2016

Related U.S. Application Data

(63) Continuation-in-part of application No. 14/957,085, filed on Dec. 2, 2015, now Pat. No. 9,616,799, which is a continuation-in-part of application No. 14/515,708, filed on Oct. 16, 2014.

(60) Provisional application No. 62/148,158, filed on Apr. 15, 2015, provisional application No. 61/891,630, filed on Oct. 16, 2013.

(51) Int. Cl.
| | |
|---|---|
| *B60P 3/22* | (2006.01) |
| *B60P 3/24* | (2006.01) |
| *B62D 35/00* | (2006.01) |
| *B62D 63/08* | (2006.01) |

(52) U.S. Cl.
CPC .......... *B62D 35/001* (2013.01); *B60P 3/2205* (2013.01); *B60P 3/2245* (2013.01); *B60P 3/243* (2013.01); *B62D 63/08* (2013.01)

(58) Field of Classification Search
CPC ............. B60P 3/22; B60P 3/24; B62D 35/001
USPC ........ 280/837, 839; 406/122, 39; 298/24, 27
See application file for complete search history.

(56) References Cited

U.S. PATENT DOCUMENTS

| | | |
|---|---|---|
| RE8,071 E | 2/1878 | McGarry |
| 1,081,032 A | 12/1913 | Evens |
| 2,038,265 A | 4/1936 | Bradley |
| 2,086,134 A | 7/1937 | Ludwick |
| 2,097,113 A | 10/1937 | Bradley |
| 2,119,671 A | 6/1938 | Francis |
| 2,185,030 A | 12/1939 | Lockwood |
| 2,616,758 A | 11/1952 | Meyers |

(Continued)

FOREIGN PATENT DOCUMENTS

| | | |
|---|---|---|
| CA | 2212020 A1 | 8/1997 |
| WO | 2008125863 A1 | 10/2008 |

OTHER PUBLICATIONS

Product News, Sep. 2013, prior Fruehof tank trailer configuration, http://www.1087vehicles.org/New%20Products/13_sep.php; printed Apr. 14, 2015.

(Continued)

*Primary Examiner* — Tony Winner
(74) *Attorney, Agent, or Firm* — Senniger Powers LLP

(57) ABSTRACT

A pneumatic tank trailer includes a carriage and a tank supported on the trailer that can selectively discharge fluidizable material through hoppers of the tank. A nose portion of the trailer has a generally conical shape. The nose portion has a top that slopes downward and sides that taper inward as it extends forward. A cross-sectional center point of a front end of the nose portion is lower than a cross-sectional center point of a rear end of the nose portion along the height of the trailer. The length of the nose portion is at least 15% of the length of the trailer. Adjacent hoppers intersect at hopper crotches. The hopper crotches have short heights and the hoppers are arranged relatively close together.

18 Claims, 31 Drawing Sheets

(56) References Cited

U.S. PATENT DOCUMENTS

| | | | |
|---|---|---|---|
| 2,626,813 | A | 1/1953 | Edward |
| D170,969 | S | 12/1953 | Clough |
| 2,689,462 | A | 9/1954 | Brandon |
| 2,721,006 | A | 10/1955 | Knutsen |
| 3,058,753 | A | 10/1962 | Carlsen |
| 3,139,286 | A | 6/1964 | Johnson |
| 3,187,766 | A | 6/1965 | Black |
| 3,252,431 | A | 5/1966 | Phillips |
| 3,311,269 | A | 3/1967 | Mendez |
| 3,325,177 | A | 6/1967 | Arthur |
| 3,419,310 | A | 12/1968 | Gramlich |
| 3,543,692 | A | 12/1970 | Stark et al. |
| 3,679,082 | A | 7/1972 | Gramlich |
| 3,883,148 | A | 5/1975 | Miller |
| 3,917,084 | A | 11/1975 | Swisher, Jr. et al. |
| 4,188,152 | A | 2/1980 | Kitt |
| 4,230,048 | A | 10/1980 | Gordon et al. |
| 4,258,953 | A | 3/1981 | Johnson |
| 4,348,047 | A | 9/1982 | Harshman |
| D274,322 | S | 6/1984 | Hayes |
| 4,606,570 | A | 8/1986 | Neumann |
| 4,643,475 | A | 2/1987 | Neumann |
| 4,729,570 | A | 3/1988 | Welch, Jr. |
| 4,741,569 | A | 5/1988 | Sutphen |
| 4,818,024 | A | 4/1989 | Michel |
| 4,884,923 | A | 12/1989 | Wellink |
| 4,899,901 | A | 2/1990 | Nickel |
| 5,064,091 | A | 11/1991 | Gerhard |
| 5,326,156 | A | 7/1994 | Heider et al. |
| 5,630,625 | A | 5/1997 | Shaw |
| RE35,580 | E | 8/1997 | Heider et al. |
| 5,782,524 | A | 7/1998 | Heider et al. |
| 5,819,970 | A | 10/1998 | Solimar |
| 5,855,456 | A | 1/1999 | Mueller |
| 5,911,337 | A | 6/1999 | Bedeker |
| 6,173,991 | B1 | 1/2001 | Piona et al. |
| 6,196,590 | B1 | 3/2001 | Kim |
| 6,286,894 | B1 | 9/2001 | Kingham |
| 6,457,630 | B1 | 10/2002 | Nilsson |
| 6,666,498 | B1 | 12/2003 | Whitten |
| 6,958,887 | B2 | 10/2005 | Hiraguchi |
| 7,108,315 | B1 | 9/2006 | McCloud |
| D542,185 | S | 5/2007 | Remington |
| D544,815 | S | 6/2007 | Williams |
| D546,245 | S | 7/2007 | Heard |
| 7,488,030 | B2 | 2/2009 | Nadeau |
| 7,516,908 | B1 | 4/2009 | Sack |
| 7,651,114 | B2 | 1/2010 | Weber et al. |
| 7,712,820 | B1 | 5/2010 | Kyle |
| 7,795,837 | B1 | 9/2010 | Haun et al. |
| 7,967,369 | B2 | 6/2011 | Davidson |
| 8,025,329 | B1 | 9/2011 | Kron |
| 8,066,318 | B2 | 11/2011 | Mazzarelli et al. |
| 8,082,698 | B2 | 12/2011 | Drake |
| 8,186,745 | B2 | 5/2012 | Graham |
| D662,461 | S | 6/2012 | Fu et al. |
| 8,308,213 | B1 | 11/2012 | Sharkey |
| 8,573,680 | B2 | 11/2013 | Smith |
| D716,701 | S | 11/2014 | Beelman, III |
| 2003/0075915 | A1 | 4/2003 | Kim |
| 2003/0132644 | A1 | 7/2003 | Crews |
| 2006/0049661 | A1 | 3/2006 | Mazzarelli et al. |
| 2008/0073895 | A1 | 3/2008 | Herman et al. |
| 2008/0190929 | A1 | 8/2008 | Gloor et al. |
| 2008/0211259 | A1 | 9/2008 | Nadeau |
| 2008/0265617 | A1 | 10/2008 | Davidson |
| 2009/0085394 | A1 | 4/2009 | Lemmons |
| 2009/0145905 | A1 | 6/2009 | Kim |
| 2010/0308063 | A1 | 12/2010 | Pu et al. |
| 2010/0320725 | A1 | 12/2010 | Thorpe, Sr. |
| 2011/0049207 | A1 | 3/2011 | Hufgard |
| 2011/0198145 | A1 | 8/2011 | Bullis |
| 2011/0209418 | A1 | 9/2011 | Drake |

OTHER PUBLICATIONS

Sandhills Publishing Company, Truck Paper, 1965 Fruehauf 850 Cu Ft Holds Pressure and Operational Tank Trailers—Pneumatic/. . . , 2 pages, http://www.truckpaper.com/listingsdetail/detail.aspx?OHID=5910687, Aug. 31, 2015.

Robert Lafrenière Truck Pictures—Bulk Hauler Trucks, four pages, last updated Feb. 28, 2014.

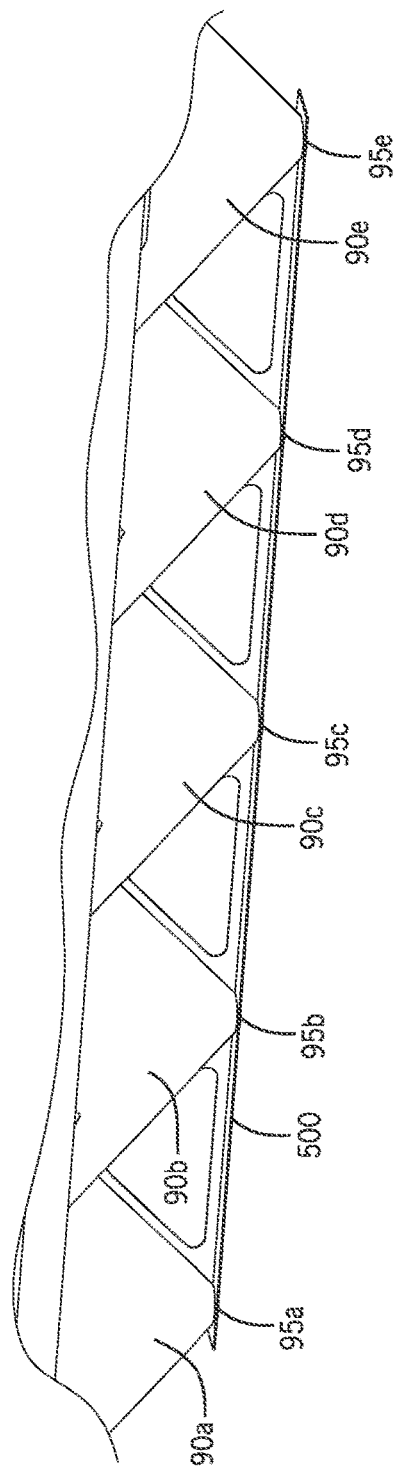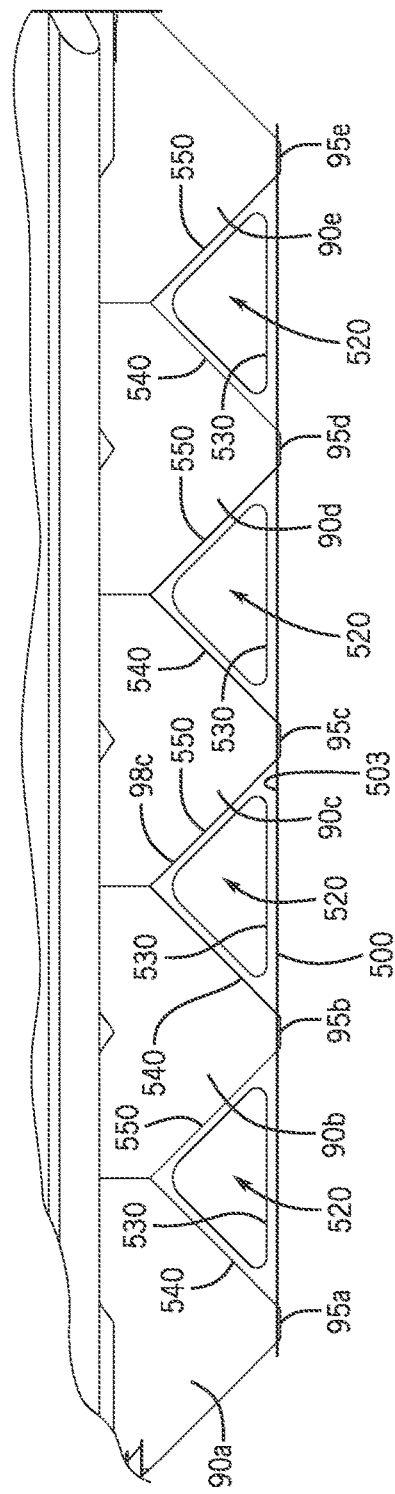

PNEUMATIC TANK TRAILER

CROSS REFERENCE TO RELATED APPLICATION

This application is a continuation-in-part of U.S. patent application Ser. No. 14/957,085, filed Dec. 2, 2015, which is a continuation-in-part of U.S. patent application Ser. No. 14/515,708, filed Oct. 16, 2014, which claims the benefit of U.S. Provisional Patent Application No. 61/891,630 filed Oct. 16, 2013. This application also claims the benefit of U.S. Provisional Patent Application No. 62/148,158, filed Apr. 15, 2015. Each of these applications is hereby incorporated by reference in its entirety.

FIELD OF INVENTION

The present invention relates to a pneumatic tank trailer.

BACKGROUND OF INVENTION

Pneumatic tank trailers are commonly used to haul a variety of dry bulk materials, such as, for example, lime products, cement, fly ash, food products, etc. The pneumatic tank trailers include a tank that receives the dry bulk materials. The tank typically includes one or more hoppers positioned along a bottom portion of the tank for unloading the dry bulk material below the trailer. Such hoppers typically widely spaced apart from one another to accommodate tall funnel portions, which direct the dry bulk materials to lower nozzles. A front region of a conventional pneumatic tank trailer is generally exposed to oncoming air during travel. The front region of the conventional pneumatic tank trailer faces generally perpendicular to the direction of travel, and the front region is exposed to the oncoming air and creates turbulence, as the air strikes against various plumbing fittings and structural members positioned at the front of the trailer. This front region often includes the structural and support members as well as plumbing, parts of plumbing, fittings, valves, and pipes for the pressurizing systems. When the trailer is moving, wind and air strike the front of the trailer, plumbing, fittings, and pipes thus creating turbulence and drag. This turbulent air is directed about the trailer, resulting in reduced fuel efficiency for the vehicle towing the pneumatic tank trailer. External vertical ribs are often positioned generally perpendicular to a length of a tank on pneumatic trailers. The external vertical ribs cause wind resistance and drag, and thus reduce fuel efficiency.

SUMMARY OF INVENTION

A pneumatic tank trailer with improved aerodynamic efficiency is described. A pneumatic tank trailer with several functional improvements is described.

In one aspect, a pneumatic tank trailer has a front end, a rear end, and a length extending between the front end and the rear end along a longitudinal axis of the trailer. The trailer comprises a carriage for movement over a road. A tank defines a tank interior and includes at least one hopper in fluid communication with the tank interior. The tank is configured to receive a fluidizable material in the interior and to selectively discharge the fluidizable material through the at least one hopper below the tank. A nose portion has a generally arcuate cross-sectional shape, a rear end, a front end, a length extending between the rear and front ends along the longitudinal axis of the trailer, a top, and a width. The width of the nose portion tapers inward as the nose portion extends from the rear end to the front end. The top of the nose portion slopes downward from the rear end at a skew angle relative to the longitudinal axis of the trailer. The rear end of the nose portion has a cross-sectional center point, and the front end of the nose portion has a cross-sectional center point. The cross-sectional center point of the front end is located below the cross-sectional center point of the rear end. The length of the nose portion is at least about 15% of the length of the trailer.

In another aspect, a pneumatic tank trailer has a front end, a rear end, and a length extending between the front end and the rear end along a longitudinal axis of the trailer. The trailer comprises a carriage for movement over a road. A tank has a top and defines a tank interior. The tank includes a plurality of hoppers spaced apart along the length of the trailer in fluid communication with the tank interior. The tank is configured to receive a fluidizable material in the interior and to selectively discharge the fluidizable material through the hoppers below the tank. Each hopper is joined to an adjacent hopper at a hopper crotch and slopes downward from the hopper crotch to a nozzle at a bottom end of the hopper. The tank has a tank height extending from the bottom ends of the hoppers to the top of the tank and the hoppers having a hopper height extending from the bottom ends of the hoppers to the hopper crotch. The hopper height is less than about 30% of the tank height.

Other objects and features will be in part apparent and in part pointed out hereinafter.

BRIEF DESCRIPTION OF DRAWINGS

FIG. 9 is a perspective view of the bottom rail.

FIG. 10 is a side view of the hoppers and the bottom rail.

Corresponding parts are given corresponding reference numbers throughout the drawings.

DETAILED DESCRIPTION OF INVENTION

Figure 1:
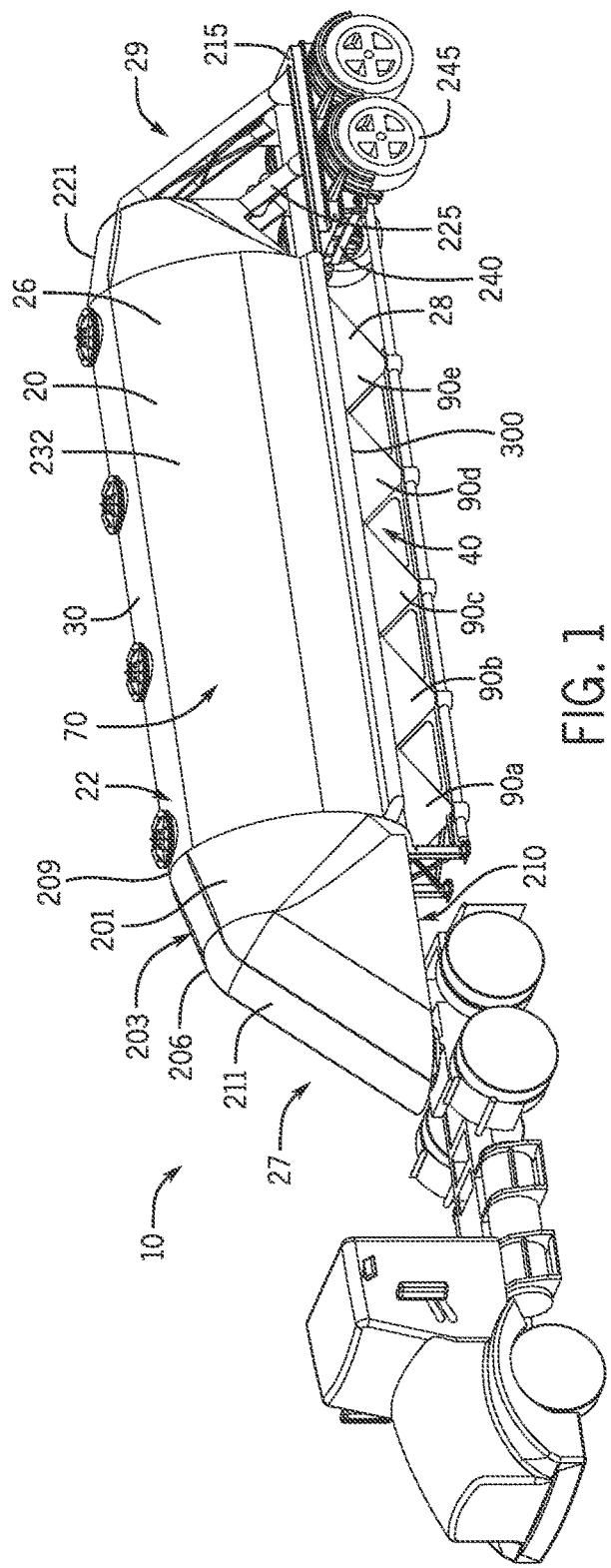
FIG. 1 is a perspective view of the pneumatic tank trailer and tractor combination.

A pneumatic tank trailer 10 and components thereof are shown in FIGS. 1-14. The pneumatic tank trailer 10 includes a tank 20 that defines an interior volume 25. The tank 20 is the holding section of the pneumatic tank trailer 10 that can be pressurized. The pneumatic tank trailer 10 includes a front end portion 27 that is proximate a king pin of the pneumatic trailer 10. The king pin connects the pneumatic tank trailer 10 to the tractor or other towing vehicle. The pneumatic tank trailer 10 includes a rear end portion 29 proximate rear wheels 245 of the pneumatic tank trailer 10. The interior volume 25 may be pressurized to facilitate unloading of the dry bulk material.

The pneumatic tank trailer 10 includes an aerodynamic shape that improves fuel efficiency. The pneumatic tank trailer 10 may be designed for traveling over one million miles during its lifetime, and aerodynamic efficiency results in significant fuel costs savings. As described below, the pneumatic tank trailer 10 includes several features to reduce weight and improve aerodynamic efficiency and thereby reduce fuel costs. The tank trailer 10 also includes several features to improve the operation and function of the tank trailer 10.

The pneumatic tank trailer 10 has a generally smooth top surface and sides, with no external vertical ribs aligned generally perpendicular to the direction of travel. The generally smooth top surface and sides help increase aerodynamic efficiency.

Figure 6:
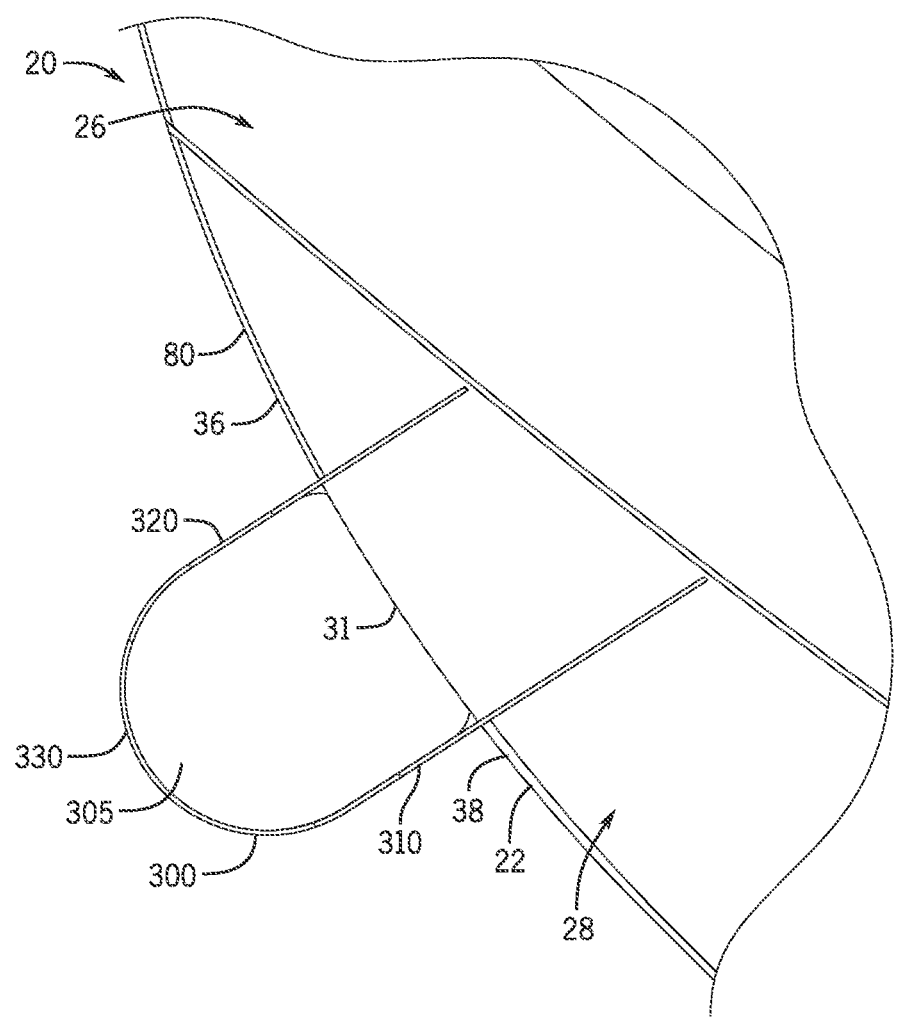
FIG. 6 is a sectional view of the tank and the hose tube.

The tank 20 includes a barrel portion 26 generally positioned above a hopper portion 28. As shown in FIG. 6, the barrel portion 26 and the hopper portion 28 are generally joined together along a joining region 31. The hopper portion 28 includes an upper hopper portion wall 38 that engages a lower barrel portion wall 36 of the barrel portion 26 at the joining region 31. The engagement between barrel portion 26 and the hopper portion 38 at the joining region 31 may include a seam, intersection, or other interconnection.

The front end portion 27 of the pneumatic tank trailer 10 also contributes to the improved aerodynamic efficiency. The front end portion 27 faces the direction of travel, and the front end portion 27 is generally exposed to the oncoming air. A front end cover 211 generally encloses the front end portion 27 of the trailer 10. A front of the tank 20 includes a front end cone 201. The front end cone 201 is integral with the barrel portion 26 of the tank 20. The front end cover 211 blends into the front end cone 201.

The front end cover 211 covers fittings and structural members to improve the aerodynamic efficiency of the pneumatic tank trailer 10. The combination of the front end cone 201 and the front end cover 211 provides for less turbulent air to pass over and to the sides of the pneumatic tank trailer 10. A seam 206 between the front end cone 201 and the front end cover 211 is made generally smooth. Likewise, a transition 209 between the front end cone 201 and the remainder of the tank 20 is made generally smooth.

Figure 2:
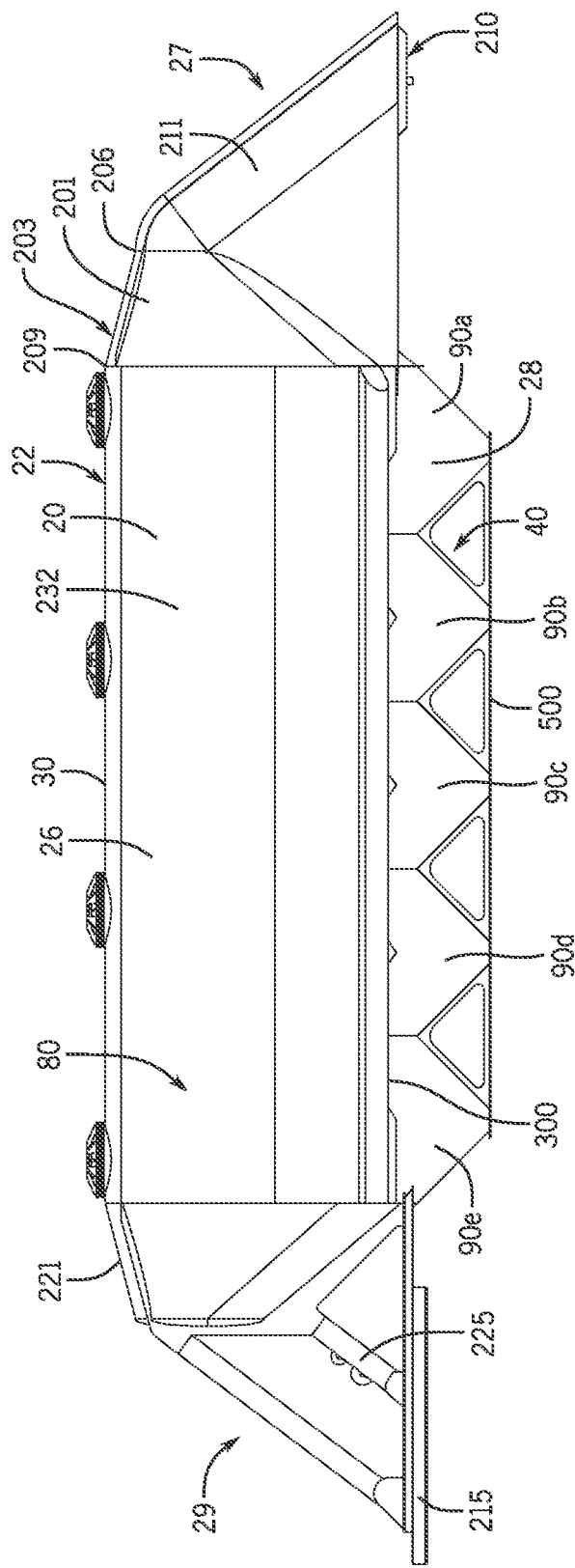
FIG. 2 is a side view of the tank.

The pneumatic tank trailer 10 includes a top surface 30 generally opposite of a bottom surface 40. The bottom surface 40 is formed from one or more hoppers 90a-e of the hopper portion 28. The top surface 30 of the tank 20 is generally flat and has zero slope longitudinally for most of or a majority of its length. The top surface 30 blends into the front end cone 201 at the transition 209. With reference to FIG. 2, a side view of the trailer 10 shows the sloping shape of the front end cone 201.

The barrel portion 26 of pneumatic tank trailer 10 also includes a first side surface 70 generally opposite of a second side surface 80. The barrel portion 26 may be welded or otherwise mechanically attached to or over the hoppers 90a-e of the hopper portion 28 in an air tight fashion. The side surfaces 70 and 80 provide a smooth, aerodynamic surface that attaches to upper edges of the hoppers 90a-e. The first and second side surfaces 70 and 80 of the pneumatic tank trailer 10 are generally smooth, with no external vertical ribs, to help increase aerodynamics. The side surfaces 70 and 80 transition into the lower barrel portion wall 36, which joins with the hopper portion 28 at the joining region 31.

The front end portion 27 of the pneumatic tank trailer 10 will now be further described. The front end cone 201 is generally positioned forward of the first hopper 90a. The front end cone 201 may include a sloping external surface 203. The front end cover 211 connects a front deck 210 and the front end cone 201. The front end cover 211 defines an interior that encloses or covers plumbing and structural members of the front deck 210. The front end cone 201 provides an aerodynamic transition between the front end cover 211 and the top surface 30 of the tank 20.

The pneumatic tank trailer 10 includes the front end cone 201 that slopes down at an angle between approximately 5 and 15 degrees from a horizontal plane. The front end cone 201 slopes down from the top surface 30 of the barrel portion 26 and in from the side surfaces 70 and 80 of the barrel portion 26 at an angle of approximately between 5 and 15 degrees. The front end cover 211 comprises a large radius to allow air to flow smoothly over the front end cover 211 and front end cone 201 of the front end portion 27. The large radius allows for air to flow smoothly over front end portion 27 and the outer surface 22 of the tank 20, reducing the aerodynamic drag.

The front end cover 211 blends right into the front end cone 201, which then transitions into an outer surface 22 of the tank 20 with no obstructions. This blending of the surfaces of the front end cover 211, the front end cone 201, and the barrel portion 26 of the tank 20 allows for smooth airflow over the outer surface 22 of the tank 20, and also reduces air flow from becoming detached from the tank 20 as the air flows over the tank 20.

The rear end portion 29 of the pneumatic tank trailer 10 will now be described with reference to FIG. 2. A rear of tank 20 includes a rear end cone 221. The rear end cone 221 is integral with the barrel portion 26. The rear end cone 221 is generally rear of the fifth hopper 90*e*. The rear end cone 221 also slopes down from the top surface 30 and in from the side surfaces 70 and 80 of the barrel portion 26 of the tank 20 at an angle between approximately 5 and 15 degrees from a horizontal plane. The rear end cone 221 attaches to a rear deck 215 via supports 225. The rear end cone 221 assists in providing an aerodynamic profile for the pneumatic tank trailer 10. At the rear end portion 29, the hopper 90*e* joins with a rear chassis 240 and the rear wheels 245.

The hopper portion 28 of the tank 20 includes the one or more hoppers 90*a-e*. With reference to FIG. 2, the hopper portion 28 includes the first hopper 90*a*, a second hopper 90*b*, and a third hopper 90*c*, a fourth hopper 90*d*, and a fifth hopper 90*e*. The first hopper 90*a* is the most forward hopper, i.e., it is the hopper closest to the tractor. The fifth hopper 90*e* is the most rear hopper. In other aspects, the tank 20 may include fewer or additional hoppers 90. For example, the tank 20 may include one, two, three, four, six, seven or more hoppers 90.

At a bottom surface 40 of the tank 20, the first hopper 90*a* leads to an opening 95*a*, the second hopper 90*b* leads to an opening 95*b*, the third hopper 90*c* leads to an opening 95*c*, the fourth hopper 90*d* leads to an opening 95*d*, and the fifth hopper 90*e* leads to an opening 95*e*. Each of the hoppers 90*a*-90*e* includes angled walls 98*a-e* leading to the openings 95*a-e*. The angled walls 98*a-e* each have a cone shape that funnels the materials to the openings 95*a-e*.

Figure 3:
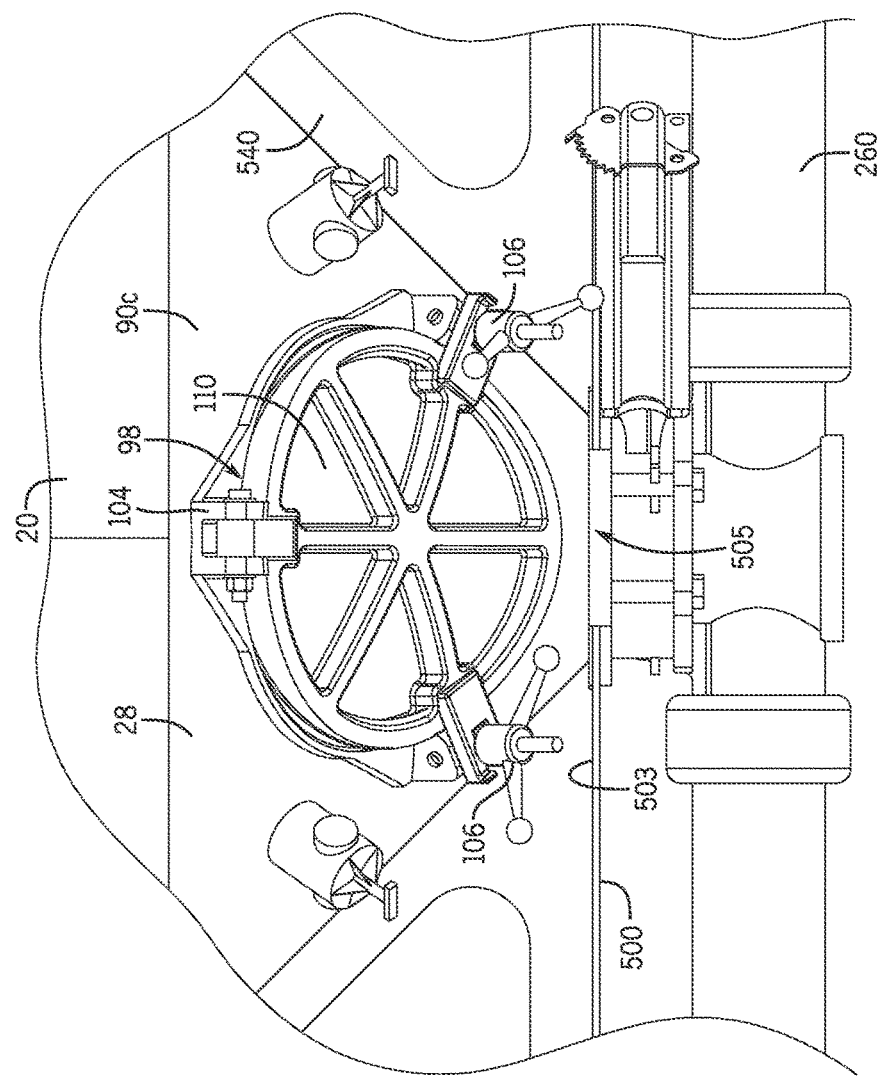
FIG. 3 is a view of the gravity unload hatch.
Figure 4:
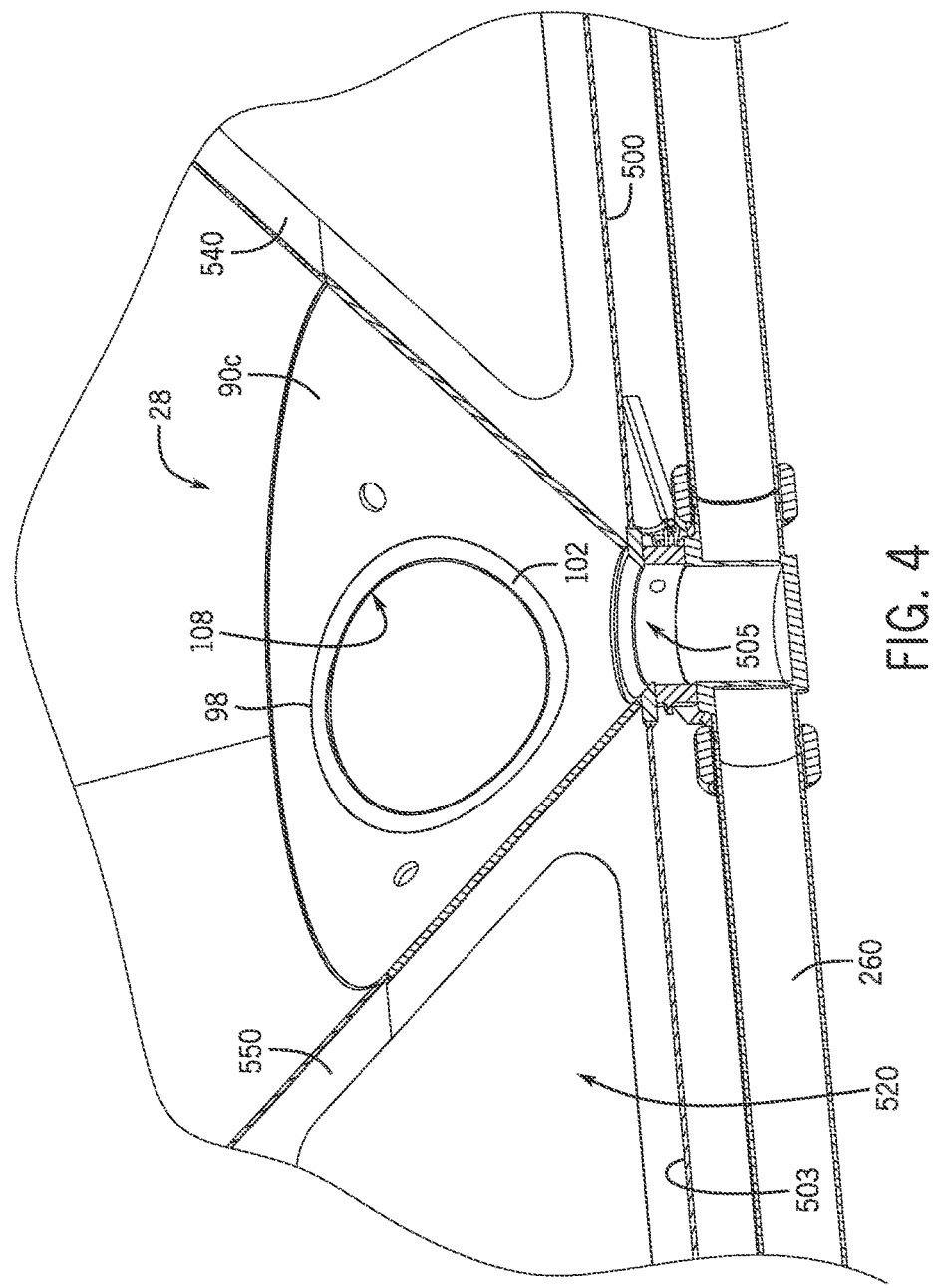
FIG. 4 is a sectional view of the hopper showing the gravity unload hatch from the inside.

An improved gravity unload hatch 110 for the hoppers 90*a-e* will now be described with reference to FIGS. 3 and 4. One or more of the hoppers 90*a-e* include the gravity unload hatch 110 for accelerated gravity unloading or dumping of the materials from the tank 20. The gravity unload hatch 110 offers a faster alternative for dumping materials to ground level or areas beneath the tank 20 than conventional unloading methods for a pneumatic trailer. The gravity unload hatch 110 opens and closes a side opening 102 of the hoppers 90*a-e*. The gravity unload hatch 110 does not impede typical unloading of pneumatic trailer 10. The side opening 102 of the hopper 90 may be fully opened by pivoting the gravity unload hatch 110 on a pivot assembly 104. The gravity unload hatch 110 is attached to the hopper 90*a-e* over a top edge 98 of the side opening 102. The pivot assembly 104 is affixed to the hopper 90*a-e* above the top edge 98 of the side opening 102. With the gravity unload hatch 110 attached to the hopper 90*a-e* at the pivot assembly 104 near the top edge 98 of the side opening 102 and with the gravity unload hatch 110 and opening upwards (towards the top of the tank trailer 10), the material from within the hopper 90*a-e* does not fall out over the gravity unload hatch 110. As such, the gravity unload hatch 110 does not impede or slow the flow of materials from the side opening 102.

The gravity unload hatch 110 also includes swing bolts 106 that provide for the gravity unload hatch 110 to press tightly against a seal (not shown) creating an airtight barrier as the gravity unload hatch 110 seals closed over the side opening 102. The gravity unload hatch 110 does not deflect further than the compression of the internal seal when the tank 20 is pressurized. The gravity unload hatch 110 mounts flush with an interior surface 108 of the hoppers 90*a-c*. The gravity unload hatch 110 also has a smooth inner surface that allows for easier cleaning of the hopper 90*a-e* and prevents material buildup in or around the gravity unload hatch 110.

Hose tubes 300, which strengthen the tank 20, will now be described with reference to FIGS. 5-7. The pneumatic tank trailer 10 includes one or more hose tubes 300 as structural members. The one or more hose tubes 300 act as a sheath or storage area for hoses that connect the tank trailer 10 to the silo equipment. The hoses are stored in the hose tubes 300 during travel from one location to another location.

The one or more hose tubes 300 may strengthen the joining region 31 between the barrel portion 26 and the hopper portion 28. The pneumatic tank trailer 10 may include one hose tube 300 along the first side surface 70 of the tank trailer 10 and a second hose tube 300 along the second side surface 80. The one or more hose tubes 300 are engineered into the tank 20 in order to strengthen the tank 20.

Figure 5:
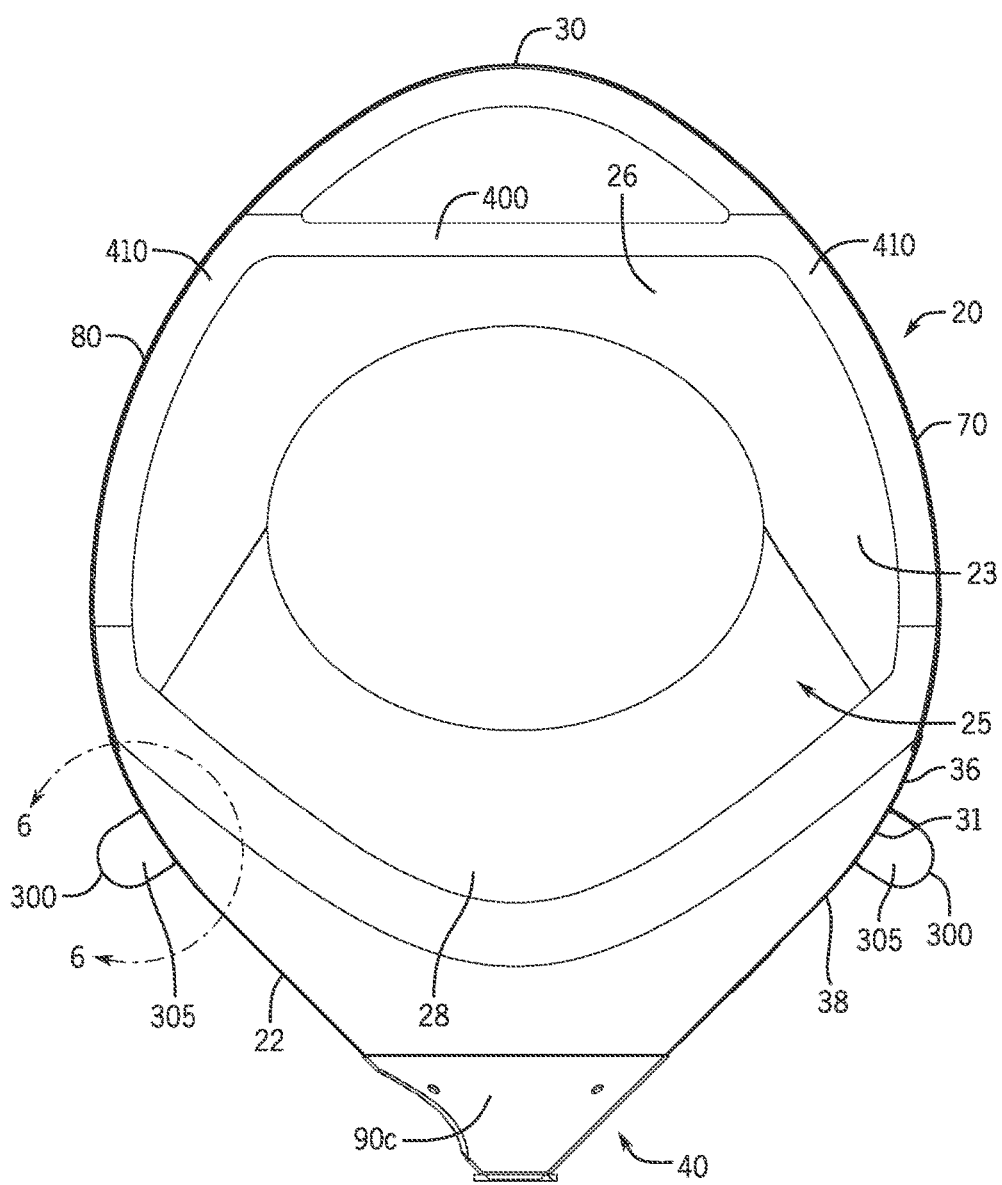
FIG. 5 is a sectional view of the tank.
Figure 7:
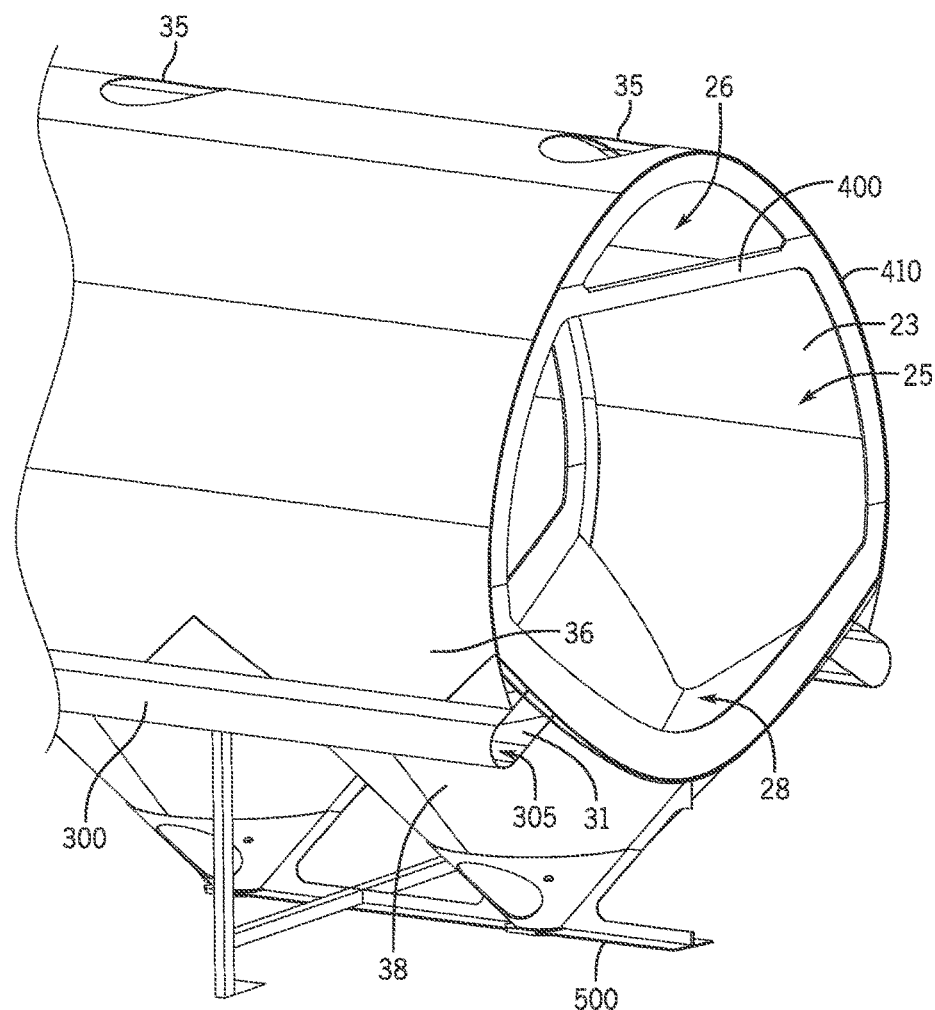
FIG. 7 is a sectional view of the tank and the hose tube.

The hose tubes 300 are shown in detail in FIGS. 5-7. At the joining region 31, the hopper portion 28 curves in and out along a length of the tank 20. Due to the curved outer exterior of the hoppers 90*a-e*, the joining region 31 includes an irregular or undulating border between the hopper portion 28 and the barrel portion 26. Along the length of the hose tubes 300, the hose tubes 300 may alternatingly connect to the barrel portion 26 and to the hopper portion 28. The pneumatic tank trailer 10 integrates the hose tubes 300 into the tank 20 to add stiffness to the intersection of the hoppers 90*a-e* and the remainder of the tank 20 and to the intersection of adjacent hoppers 90*a-e*. These intersections are prone to high stress and cracking, as the shape does not lend itself well to holding pressure. The use of the hose tubes 300 as a structural member decreases this stress without appreciably increasing the weight of the tank trailer 20. Further, as the hose tubes 300 are attached to the tank 20, the interactions of the hoppers 90*a-e* and the hose tubes 300 cause vortices and/or a recirculation zone to form in an airflow region between the hoppers 90*a-e* that decreases the aerodynamic drag of the tank trailer 10 when being pulled at highway speed by a tractor.

The hose tubes 300 include an inner open region 305 to contain or store the hoses. With specific reference to FIG. 7, the hose tubes 300 include a lower edge 310 and an upper edge 320. The lower edge 310 transitions into a central curved region 330 that further transitions into the upper edge 320. The lower and upper edges 310 and 320 may include a generally flat cross-section before the lower and the upper edges 310 and 320 transition into the central curved region 330. The lower and upper edges 310 and 320 engage the outer surface 22 of the tank 20. For example, the lower and upper edges 310 and 320 may be welded, riveted, or otherwise mechanically engaged to the tank 20 in an airtight fashion. The lower edge 310 may engage the upper hopper portion wall 38 and the upper edge 320 may engage the lower barrel portion wall 36. The hose tubes 300 may span the joining region 31 between the barrel portion 26 and the hopper portion 28 of the tank trailer 20 in order to improve strength.

The hose tubes 300 may have sufficient length to cover or engage at least a portion of all of the hoppers 90*a-e*. Typically, the hose tubes 300 will extend along the side of the most forward hopper, i.e., the first hopper 90*a*, and extend along the side of the most rear hopper, i.e., the fifth hopper 90*e*. Typically, a first hose tube 300 will extend along the first side surface 70 and a second hose tube 300 will extend along the second side surface 80. In other aspects, the hose tubes 300 may have a squared, box-like, arcuate, or semi-circular shape.

Figure 8:
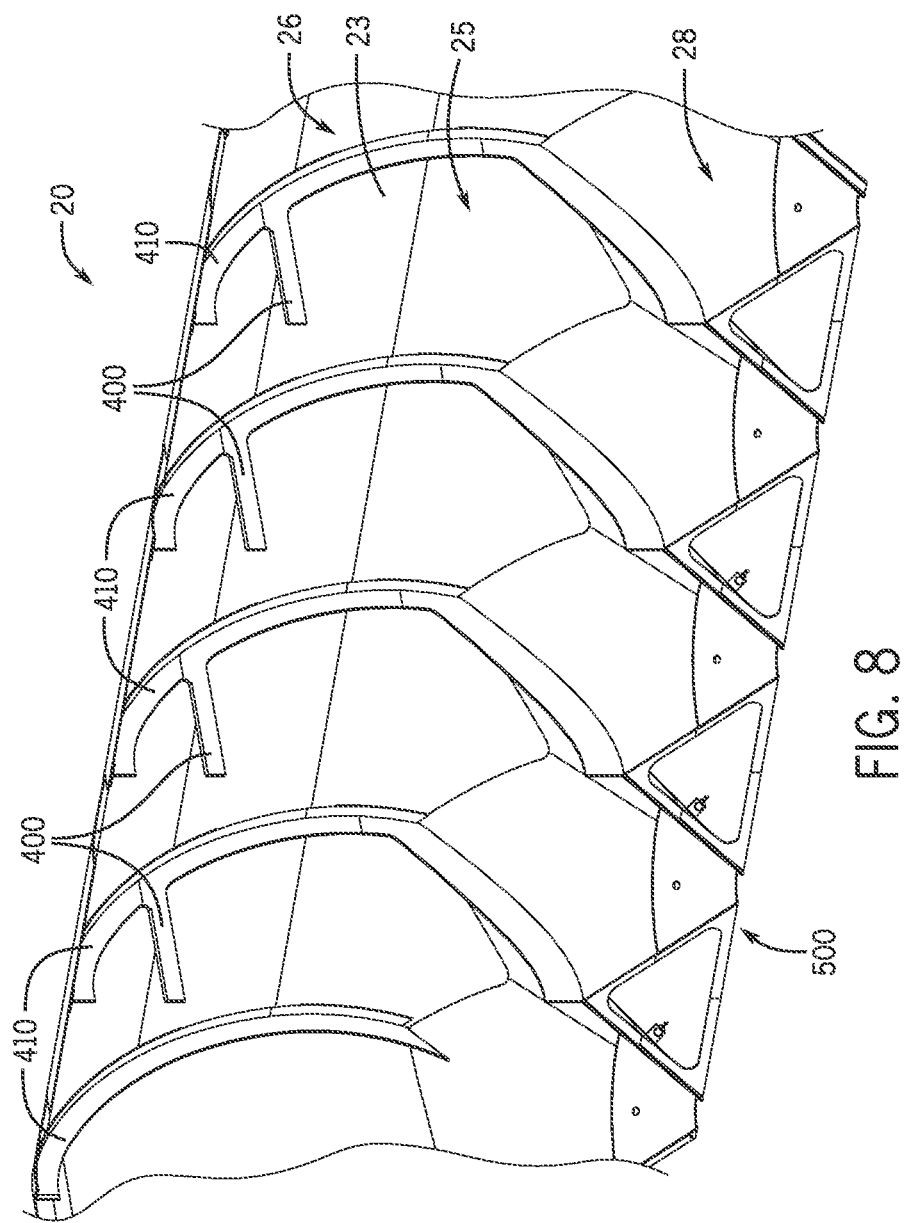
FIG. 8 is a perspective sectional view of the tank.

An improved shape for the tank 20 will now be described with reference to FIGS. 5 and 8. The barrel portion 26 of the tank 20 further includes an ovoid shape cross-section, similar to an egg-shape. The barrel portion 26 has its greatest width toward its engagement with the hopper portion 28. The barrel portion 26 is generally narrower in width closer to the top surface 30 and wider in width closer toward the joining region 31. The barrel portion 26 has a smaller radius near the top surface 30 than a radius nearer to the hopper portion 28.

The ovoid egg-shape of the tank 20 significantly reduces the amount of dead space in the tank 20. The dead space is an empty area of the tank 20 which is not filled when a material is loaded into the tank 20 from the top manhole covers 35. This design allows for high percentage first pass fill during the loading of materials into the tank 20, and the design also decreases the amount of time required to pressurize the trailer 10. The egg-shape cross-section of the tank 20 may also allow the trailer 10 to carry a larger load with a smaller cubic foot trailer (e.g., a 1700 cubic foot egg-shaped trailer may hold as much as oval 1800 cubic foot trailer 10 when each are loaded with a single pass). This also increases the aerodynamic efficiency of the trailer 10 by reducing the cross sectional area perpendicular to the area of travel without decreasing the load carrying capacity of the trailer 10.

The interior volume 25 of the tank 20 may be filled with a dry bulk material. The one or more manholes 35 are positioned in the top surface 30. The dry bulk materials are passed through the manholes 35 in order to fill the interior volume 25 of the tank 20 with the dry bulk materials. With the egg-shape of the tank 20, more efficient and even filling of the tank 20 is achieved.

The tank 20 further includes one or more internal cross-supports 400 near an approximate top one-third of the tank 20. The cross-supports 400 extend across the barrel portion 26. The cross-supports 400 help support the tank 20 against the internal pressure from pressurization and the weight of the materials. The internal cross-supports 400 help maintain the cross-sectional area of the barrel portion 26. The stress from pressurization will urge the barrel portion 26 to have a more rounded cross-section. The deflection that occurs when an egg-shaped trailer tries to become round may cause significant stress. However, the cross-supports 400 placed between the internal ribs 410 significantly decrease the stress in the egg-shaped tank 20.

The one or more internal cross-supports 400 are positioned in the barrel portion 26 of the tank 20. The tank 20 further includes internal ribs 410 that engage an inner surface 23 of the tank 20. The internal ribs 410 have a generally vertical orientation, and line the inner surface 23 of the tank 20. The cross-supports 400 extend in a direction generally perpendicular to the direction of travel of the tank trailer 10. The cross-supports 400 are engaged to the internal ribs 410, and the cross-supports 400 extend the entire span between the internal ribs 410, i.e., the width of the tank 20. The cross-supports 400 may pass through the interior 25 of the tank 20. The cross supports 400 are manufactured to have no or very little upward facing surfaces so that materials will not be caught on the cross supports 400. The cross supports 400 are also connected to the internal ribs 410 with a large radius to facilitate cleaning of the tank 20.

An improved frameless design for the trailer 10 will now be described with reference to FIGS. 9 and 10. The tank 20 further includes a bottom rail 500. By eliminating the typical side frames used in many conventional tank trailers, the weight of the trailer 20 is reduced and fuel efficiency is improved. The bottom rail 500 is mounted to the tank 20. The bottom rail 500 also limits the deflection of the hoppers 90*a-e* and helps to maintain the stresses at an acceptable level. The bottom rail 500 also makes it easier to manufacture the trailer 20 right side up.

With reference to FIG. 10, the bottom rail 500 extends along the bottom of the hoppers 90*a-e* from the most forward hopper 90*a* to the most rear hopper 90*e*. The bottom rail 500 lies along a central axis for the trailer 10. The tank 20 may include a single bottom rail 500 as its frame. The tank 20 does not require additional frame members positioned along the bottom surface 40.

The bottom rail 500 is integrated with one or more triangular supports 520. The triangular supports 520 generally include three surfaces. A bottom surface 530 of the triangular support 520 engages a top surface 503 of the bottom rail 500. A front surface 540 of the triangular support 520 engages the exterior surface of one of the hoppers 90*a-e*, while a rear surface 550 of the triangular support 520 engages the exterior surface of an adjacent hopper 90*a-e*. Generally, a triangular support 520 is positioned between each hopper 90*a-e*. For example, the pneumatic tank trailer 10 includes five hoppers 90*a-e*, and thus four triangular supports 520 are used in order to position a triangular support 520 between each of the hoppers 90*a-e*.

The bottom rail 500 includes one or more openings 505 positioned to receive the openings 95*a-e* of the hoppers 90*a-e*. The hoppers 90*a-e* may pass through the openings 505 in the bottom rail 500, seal the openings 95*a-e* against the openings 505 in the bottom rail 500, or seat in the lower openings 505 of the bottom rail 500.

The tank trailer 10 further includes a modular design. The interior 25 of the tank 20 may have a volume of approximately 700 cubic feet of storage to approximately 2500 cubic feet of storage, depending upon the size of the hoppers 90*a-e* and the number of hoppers 90*a-e* utilized. The individual hoppers 90*a-e* may all have a substantially similar or an identical design. The capacity of the pneumatic tank trailer 10 may be increased by adding additional hoppers 90. The same components, i.e., the hoppers 90, front end cones 201, rear end cones 221, and front end covers 211, may be used with trailers 20 of different lengths. The only difference between the trailers 20 would be the number of hoppers 90 and the length of the barrel portion 26. A pneumatic tank trailer 20 with two hoppers 90*a-b* may provide approximately 700 cubic feet of storage. A pneumatic tank trailer 20 with three hoppers 90*a-c* may provide approximately 1000 cubic feet of storage. A pneumatic tank trailer 20 with four hoppers 90*a-d* may provide approximately 1350 cubic feet of storage. A pneumatic tank trailer 20 with five hoppers 90*a-e* may provide approximately 1800 cubic feet of storage. The pneumatic tank trailer 10 creates a whole family of pneumatic trailers simply by adding hoppers 90 and increasing the length of the barrel portion 26.

The hoppers 90*a-e* are fluidly connected to a discharge line 260 that extends the approximate length of the pneumatic tank trailer 10. The discharge line 260 includes a discharge opening 262 which provides for discharge of the bulk material from the tank 20. The respective openings 95*a-e* of the hoppers 90*a-e* join the discharge line 260 in order to pass the dry bulk material to the discharge line 260. Each of the hoppers 90*a-e* may include a valve for controlling discharge through their respective openings 95*a-e*. The hoppers 90*a-e* may further include aeration systems (not shown) that assist in emptying the tank 20 of the dry bulk material. Such aeration systems are well known to those skilled in the art. During travel, the dry bulk material in the tank 20 may compact, under its weight, in the lower portions of the hoppers 90a-e and the aeration system helps promote flow of the material from the hoppers 90a-e.

The hoppers 90a-e, the front end cone 201, and the rear end cone 221 and the barrel portion 26 may be formed from metals and metal alloy materials, such as aluminum, having a thickness of approximately ⅛ inch to ⅜ inch, although the thickness of the material may vary throughout the construction of the tank 20.

It is another aspect of the present invention to provide a trailer 10 with a lower center of gravity. This increases the stability of the trailer 10 as it is pulled around a corner. It is a further aspect of this invention to provide a trailer 10 that is as short in length as possible while still complying with federal bridge laws. These laws are well known to those skilled in the art. A shorter trailer 10 will be easier to maneuver and will fit into tighter quarters, which may be necessary for the loading and unloading of the tank 20. In order to accomplish these aspects, the trailer 10, in certain aspects, may be made approximately 102 inches wide. The hoppers 90a-e are also more numerous and closer together than on a conventional pneumatic trailer. This increases the amount of material that can be held lower, and thus the center of gravity is lower. These same modifications have also allowed the trailer 10 to be built having a wheel base as short as possible while still complying with federal bridge laws.

Figure 11:
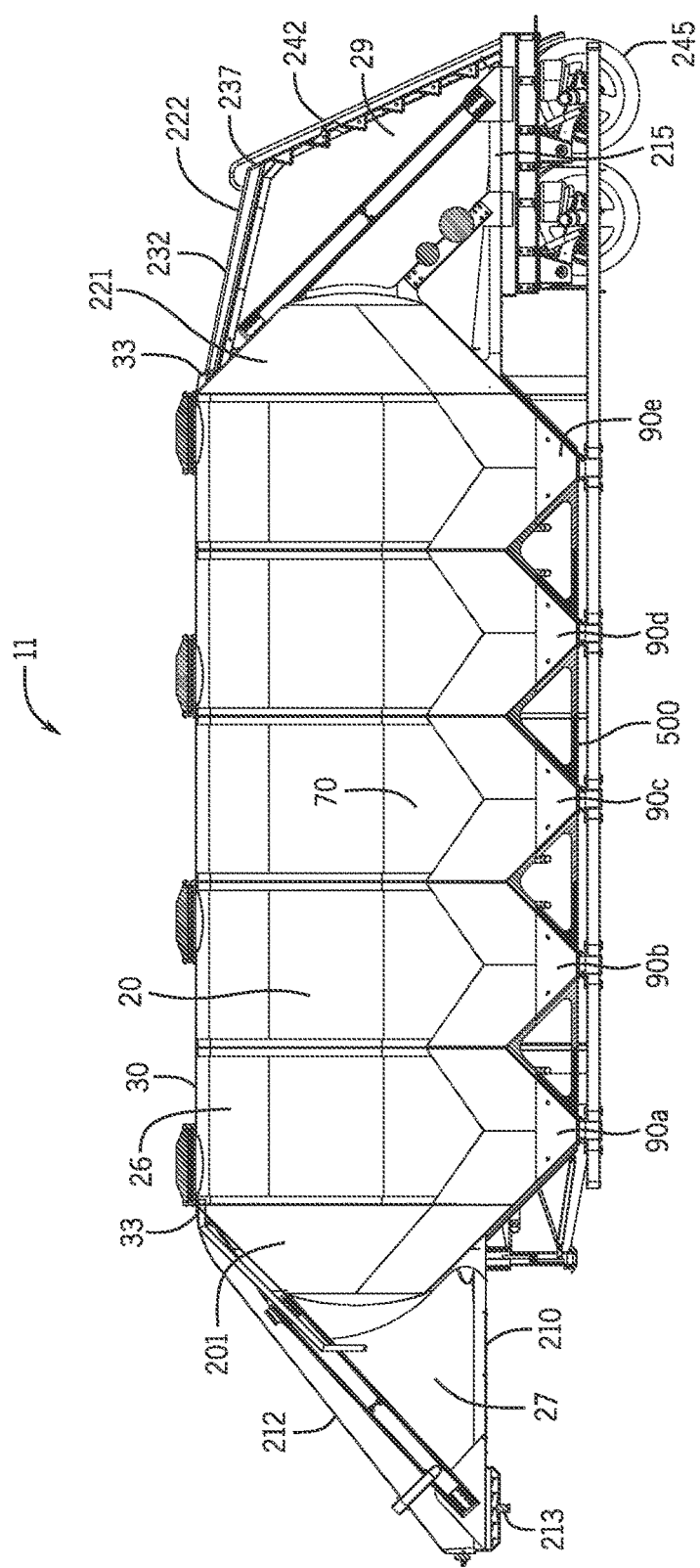
FIG. 11 is a side view of the second trailer.
Figure 12:
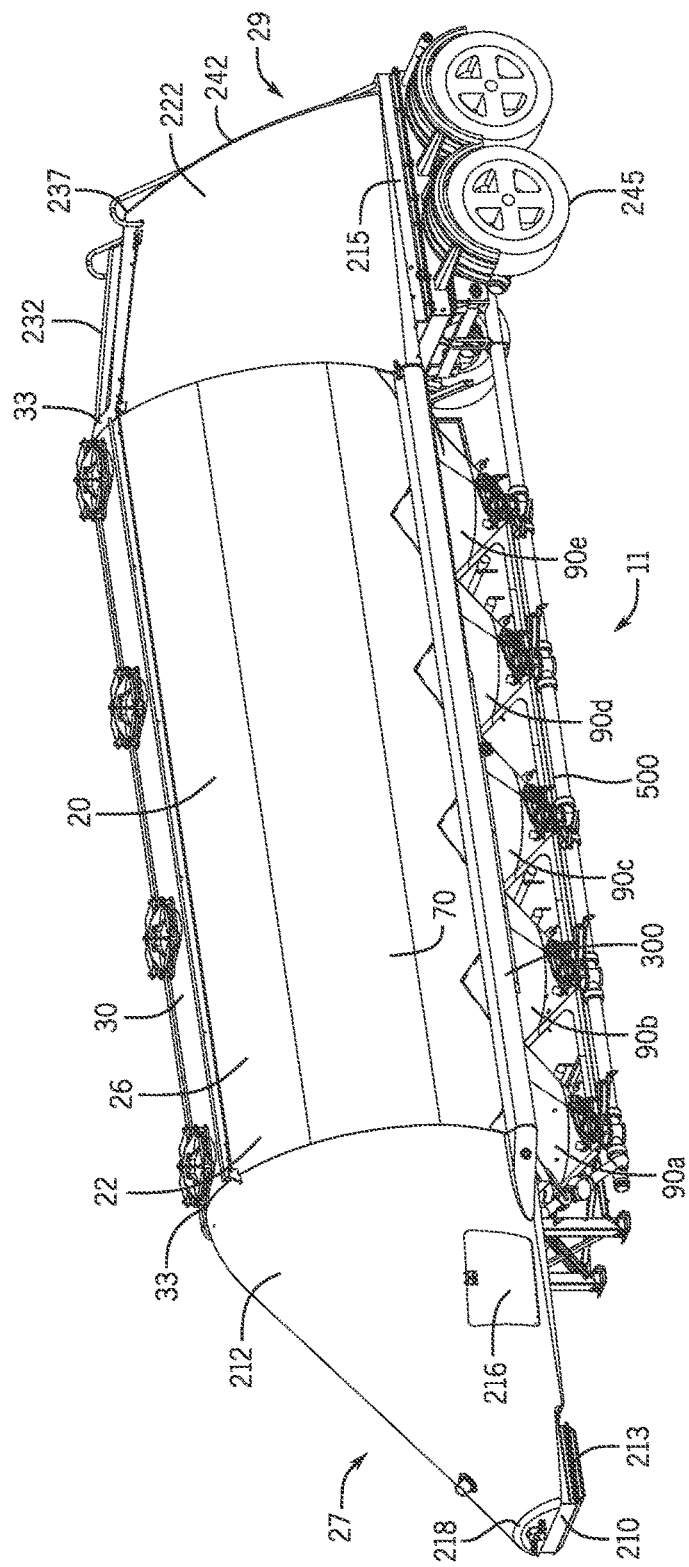
FIG. 12 is a perspective view of the second trailer.
Figure 13:
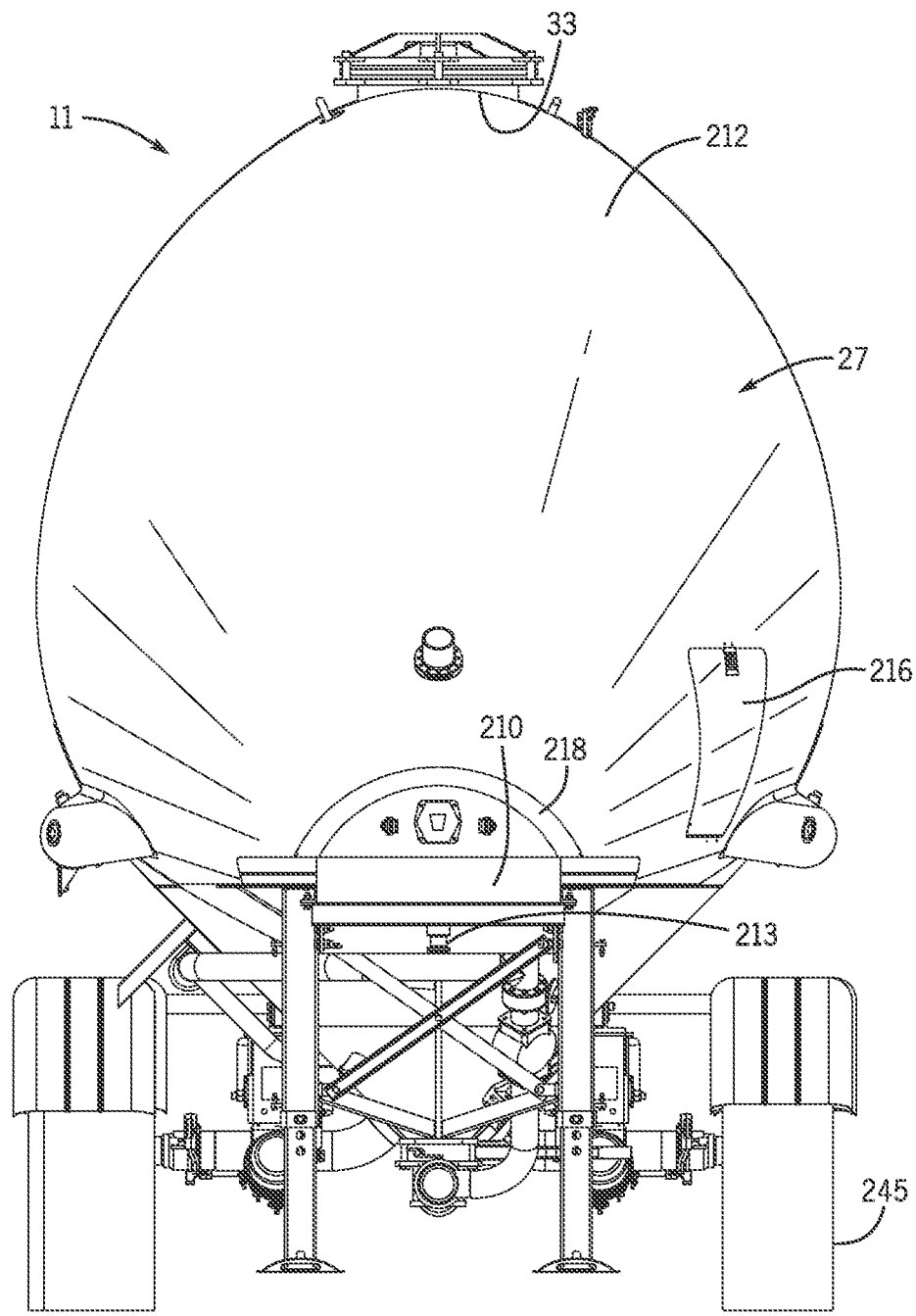
FIG. 13 is a front view of the second trailer.
Figure 14:
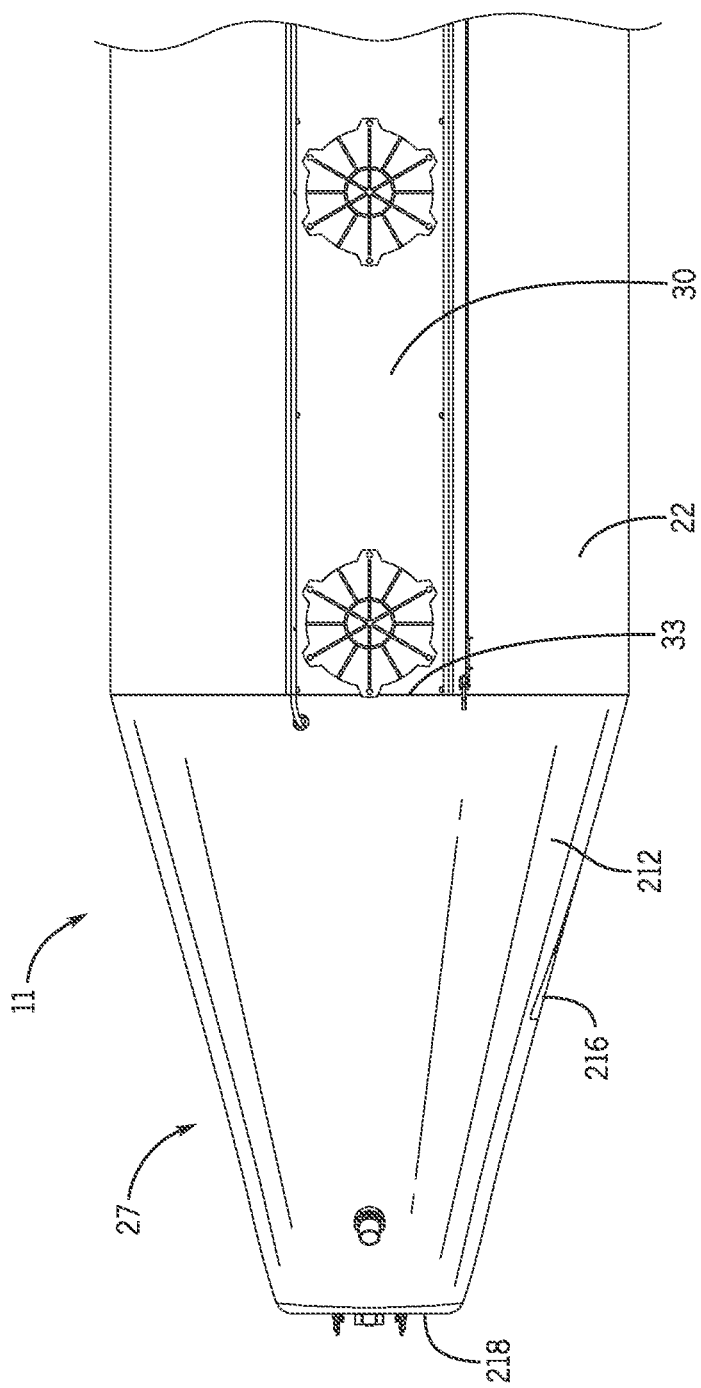
FIG. 14 is a top down view of the front section of the second trailer.

In another aspect, a trailer 11 is shown in FIGS. 11 and 12. The trailer 11 is generally the same or similar to trailer 10 in construction, except for a front end cover 212 and a rear end cover 222. Other like or similar components or structures between the trailer 10 and the trailer 11 are numbered the same in FIGS. 11 and 12. The trailer 11 includes the front end cover 212 that slopes down at an angle of approximately 10 degrees to approximately 55 degrees. The front end cover 212 substantially covers the front end cone 201 of the tank 20. The front end cover 212 extends from the top surface 30 of the barrel portion 26 and encloses the front end portion 27 of the trailer 11. The front end cover 212 extends from the top surface 30 of the barrel portion 26 to the front deck 210 of the trailer 11. The front end cover 212 may extend from the top surface 30 of the barrel portion 26 to a leading surface 218 of the front end cover 212 at an angle of approximately 10 degrees to approximately 55 degrees. The front end cover 212 provides an aerodynamic leading surface for the trailer 11 that covers the front end cone 201. Sides of the front end cover 212 also angle or taper inwards toward the leading surface 218 of the front end cover 212. The sides of the front end cover 212 may angle or taper inwards at an angle of approximately 10 degrees to approximately 25 degrees.

In the aspect shown in FIGS. 11 and 12, the front end cover 212 slopes down from the top surface 30 at an angle of approximately 45 degrees. At this angle, the front end cover 212 covers the front end cone 201, which may be formed with steeper sides to more closely match the angle of repose of the material filled into the tank 20. The front end cover 212 generally encloses the front end portion 27 of the trailer 11. The front end cover 212 slopes from the barrel portion 26 to a kingpin 213 and/or the front deck 210 of the trailer 11.

The front end cover 212 blends into the outer surface 22 of the tank 20 at a seam 33. The top surface 30 has a generally zero slope leading into the seam 33, and the front end cover 212 slopes down from the seam 33 at an angle of approximately 45 degrees.

The front end cover 212 includes an access 216, such as a hatch, door, or other removable cover that provides access to the plumbing and support structure of the trailer 11. The front end cover 212 is not an integral portion of the trailer 20, i.e., the trailer 20 may be filled and towed without the front end cover 212. The front end cover 212 may be made from aluminum, fiberglass or other suitable materials.

The trailer 11 also includes the rear end cover 222 that slopes generally down from the top surface 30 of the barrel portion 26 at an angle of approximately 5-15 degrees and in from the sides 70 and 80 of the barrel portion 26 at an angle of approximately 5-15 degrees. The rear end cover 222 substantially covers the rear end cone 221. The rear end cover 222 may extend from the top surface 30 to the rear deck 215. The rear end cover 222 may cover the entire distance between the top surface 30 and the rear deck 215. The rear end cover 222 may blend into the top surface 30 at a seam 33. The top surface 30 has a generally zero slope leading into the seam 33. At the seam 33, the rear end cover 222 slopes downward at the angle of approximately 5-15 degrees.

The rear end cover 222 includes a front portion 232 and a rear portion 242. The front portion 232 may slope downward at an angle of approximately 5-15 degrees. At the rear portion 242 of the rear end cover 222, the slope increases to approximately 45 degrees to 65 degrees or more in the downward direction. A transition point 237 may separate the front portion 232 from the rear portion 242. At the transition point 237, the slope of the rear end cover 222 increases from 5-15 degrees to approximately 45 degrees to 65 degrees. The rear end cover 222 could be formed with steps or a ladder that allows access to the top surface 30 of the trailer 11.

The rear end cover 222 may be made of aluminum, fiberglass, or other suitable materials. The rear end cover 222 includes an access, such as a hatch, door, or other removable cover that provides access to tanks, hoses, etc. stored in the rear end portion 29 of the trailer 11.

Figure 15:
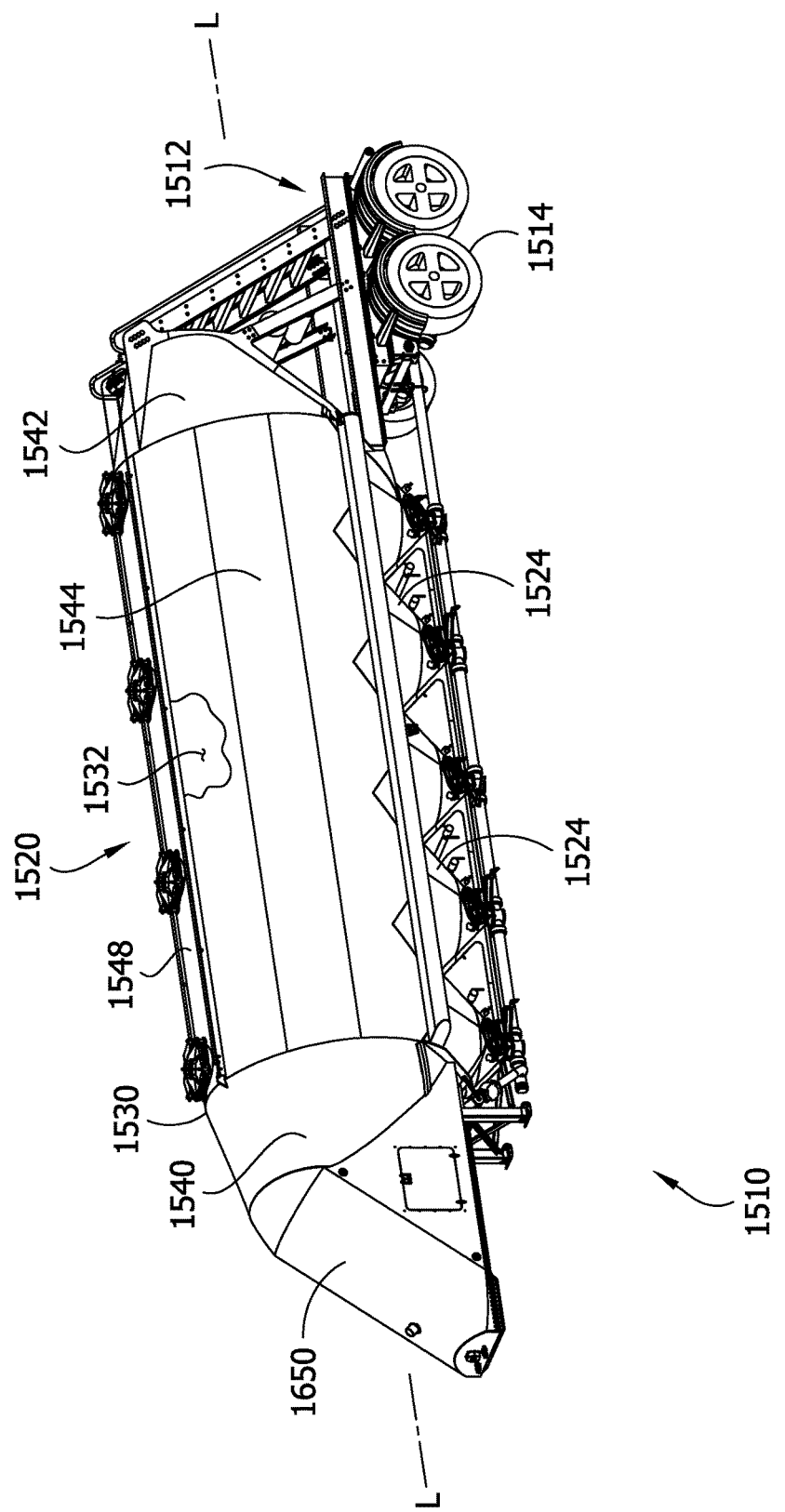
FIG. 15 is a perspective of another embodiment of a pneumatic tank trailer.
Figure 16:
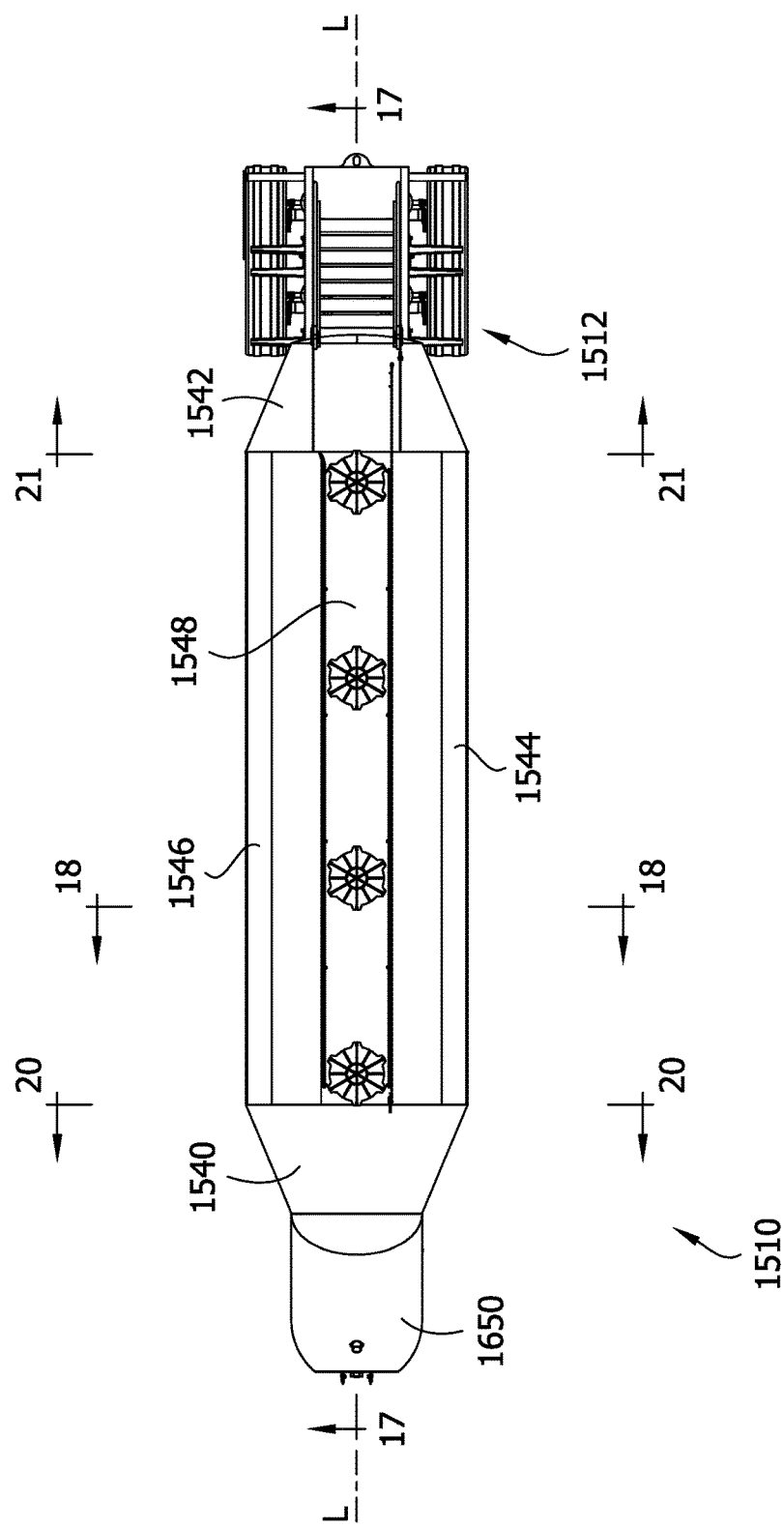
FIG. 16 is a top plan view of the trailer of FIG. 15.

Referring to FIGS. 15 and 16, another embodiment of a pneumatic tank trailer is generally indicated at reference number 1510. The trailer 1510 is similar in many respects to the trailers discussed above. The trailer 1510 includes a carriage 1512 that mounts trailer wheels 1514 for rolling along an underlying surface. The carriage 1512 supports and mounts a tank 1520, which extends along a longitudinal axis L of the trailer 1510 from a front end to a rear end adjacent the carriage. The tank 1520 includes a plurality of hoppers 1524 that define a bottom end portion of the tank and a tank wall 1530 that extends up from the hoppers 1524 and defines an interior 1532 of the tank. The tank 1520 is configured to receive fluidizable material in the interior 1532 and to selectively discharge the material through the hoppers 1524. Moreover, the interior 1532 of the tank 1520 is configured to be pressurized to cause material to more easily and completely flow out of the hoppers 1524.

As will be appreciated, lightweight framing reinforces the tank 1520 to withstand large internal pressures without adversely affecting the fuel efficiency of the trailer 1510. As will be discussed in further detail below, the weight and cost of the framing is minimized by using relatively high strength reinforcement at locations of the tank 1520 where internal fluid pressure causes significant stress and using less reinforcement at lower stress locations. The illustrated design also minimizes the amount of framing that extends externally of the tank wall 1530 to minimize the drag coefficient of the trailer 1510.

Figure 17:
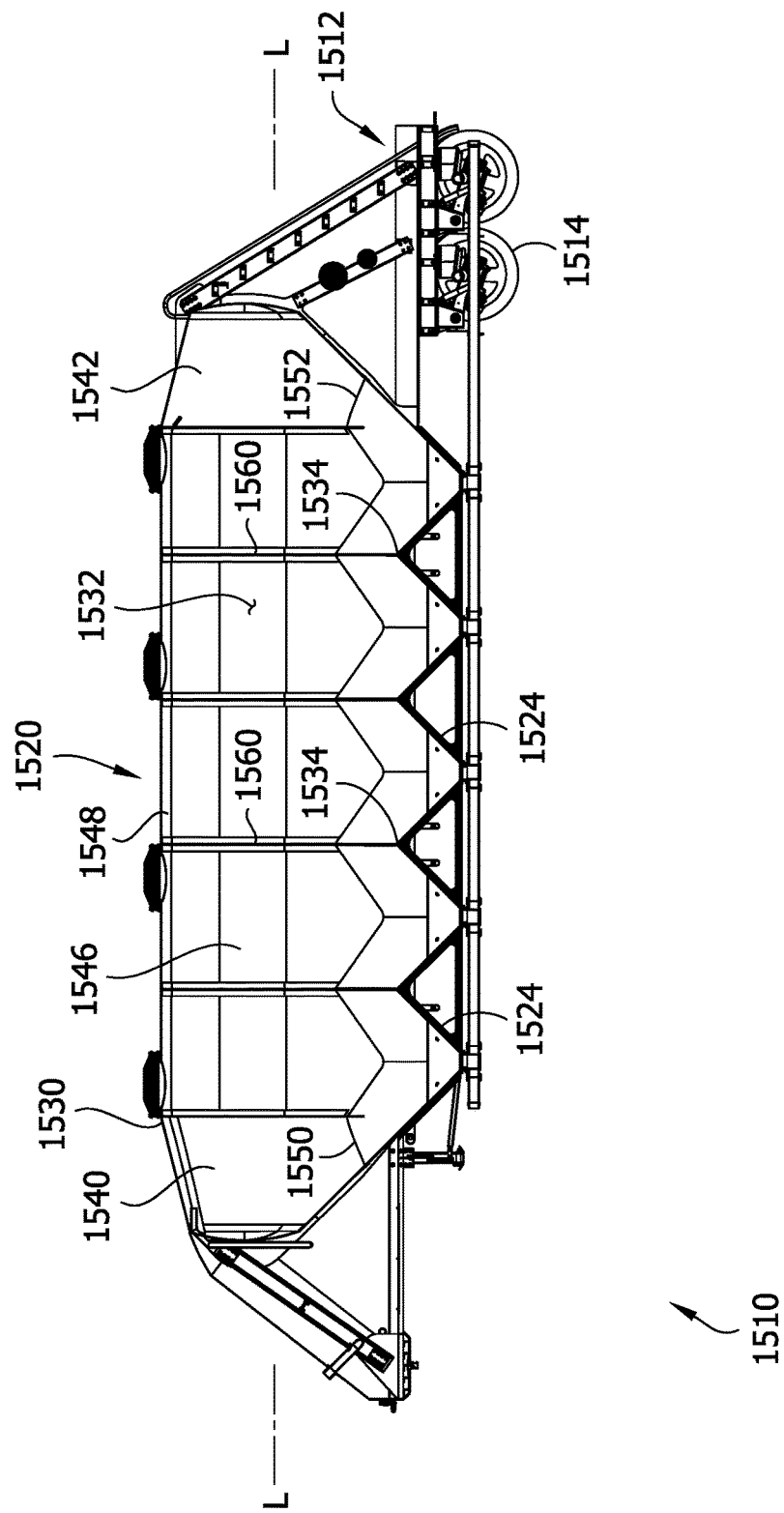
FIG. 17 is a section taken in the plane of line 17-17 of FIG. 16.

In the illustrated embodiment, the tank 1520 includes five hoppers 1524 spaced apart along the longitudinal axis L of the tank. Other embodiments can use other numbers and arrangements of hoppers without departing from the scope of the invention. Referring to FIG. 17, each of the hoppers 1524 has a top end portion and a bottom end portion. The top end portions of adjacent hoppers are arranged next to each other and define hopper joint areas 1534, and the bottom end portions of adjacent hoppers are spaced apart along the longitudinal axis L of the tank 1520. The hopper joint areas 1534 join together adjacent hoppers 1524 and define a peak so that material received in the interior 1532 of the tank 1520 at the hopper joint areas generally falls to either side of the hopper joint area and into one of the respective hoppers.

Figure 18:
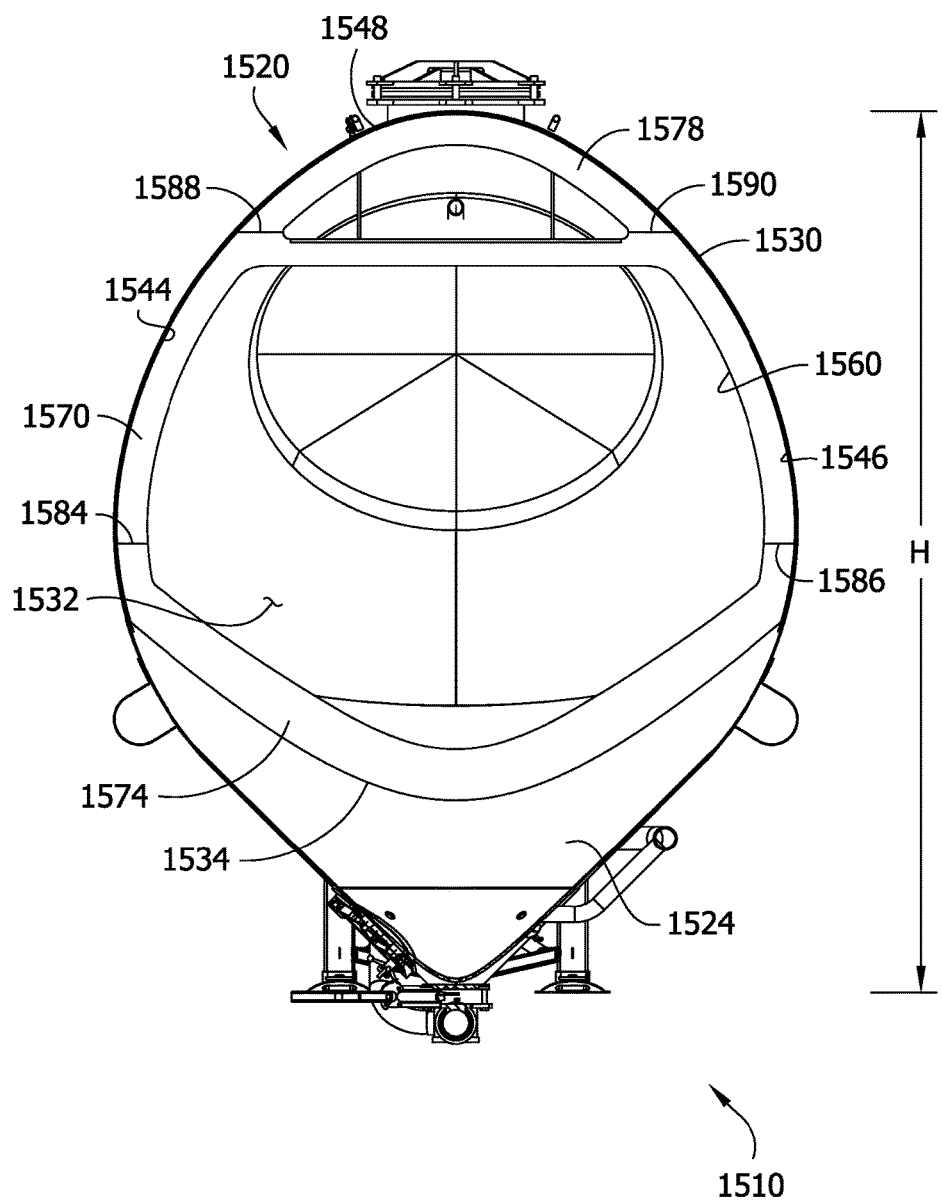
FIG. 18 is a section taken in the plane of line 18-18 of FIG. 16.

Each hopper joint area 1534 has the same general shape. Referring to FIG. 18, in the illustrated embodiment each hopper joint area 1534 has a curved shape. The hopper joint areas 1534 extend from a first high point adjacent one side of the tank 1520, to a low point about midway between the opposite sides of the tank, to another high point adjacent the opposite side of the tank.

Referring again to FIGS. 15 and 16, the tank wall 1530 extends along the longitudinal axis L of the tank 1520 from a front wall portion 1540 to a rear wall portion 1542. The tank wall 1530 also includes opposite first and second side wall portions 1544, 1546 and a top wall portion 1548. Together, the first and second side wall portions 1544, 1546 and the top wall portion 1548 extend along the longitudinal axis L from the front wall portion 1540 to the rear wall portion 1542. As shown in FIG. 17, the front wall portion 1540 is joined to the top end portion of the front hopper 1524 at a front joint area 1550. The rear wall portion 1542 is, likewise, joined to the top end portion of the rear-most hopper 1524 at a rear joint area 1552. The top wall portion 1548 extends generally laterally between the first and second side wall portions 1544, 1546 and defines the top of the tank 1520. The side wall portions 1544, 1546 have bottom edge portions that are joined to the top end portions of the hoppers 1524 to fully enclose the tank 1520. As shown in FIG. 18, the top wall portion 1548 is spaced apart from the bottom ends of the hoppers 1524 by a height H.

Figure 19:
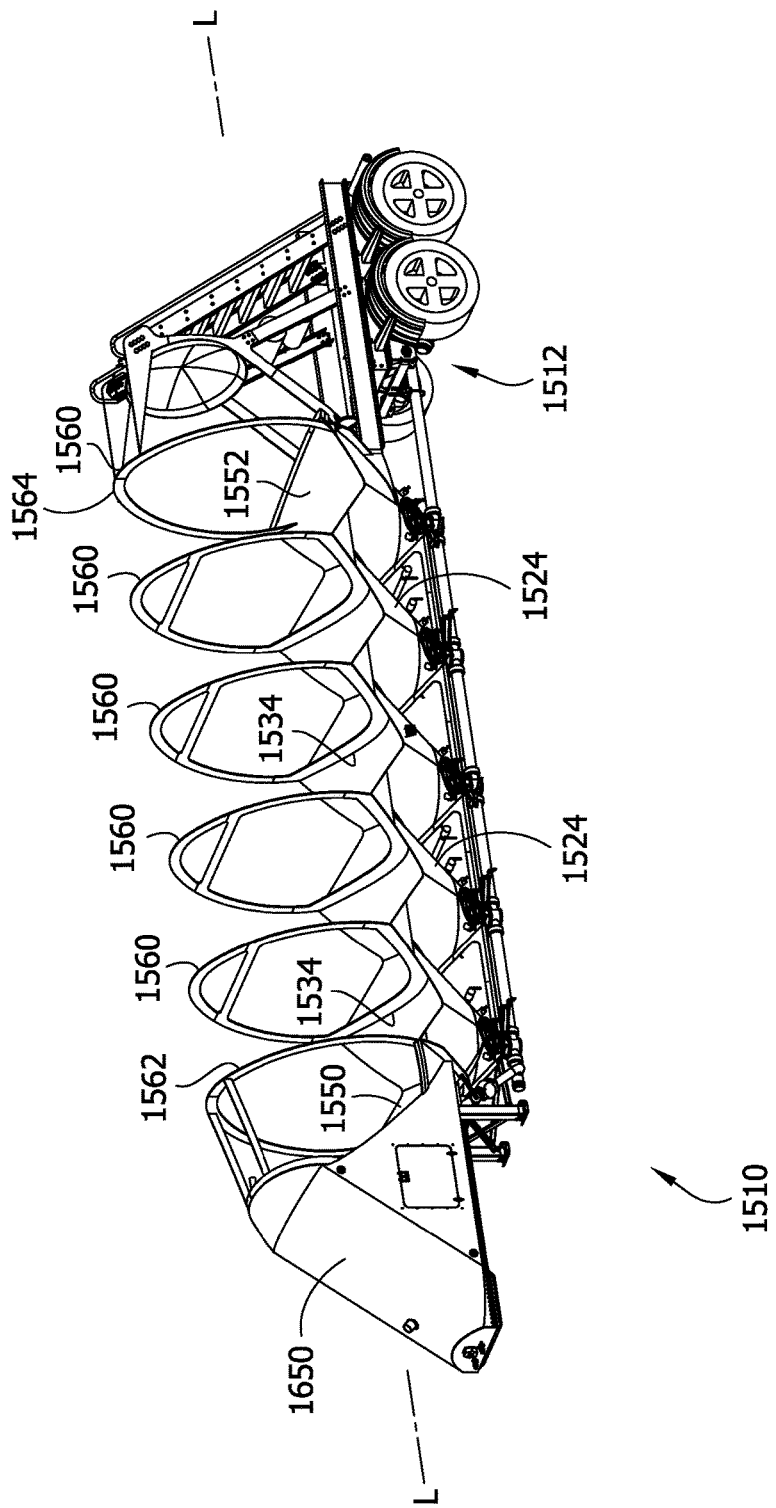
FIG. 19 is a perspective of the trailer with a tank wall removed to reveal internal components.

Referring to FIG. 19, the illustrated trailer 1510 includes a plurality of central internal frames 1560 joined to the tank 1520 in spaced apart relationship along the longitudinal axis L of the trailer 1510. The central internal frames 1560 support the tank 1520 against internal pressures therein. The central internal frames 1560 are located entirely within the interior 1532 of the tank 1520. As shown in FIG. 15, the result is a tank 1520 with a relatively smooth exterior profile, particularly along the sides and top of the tank. In contrast with prior art pneumatic tank trailers with external tank framing, the illustrated tank 1520 is thought to have a lower drag coefficient, which is thought to improve the fuel efficiency of the trailer 1510.

Each of the internal frames 1560 is longitudinally aligned with a respective hopper joint area 1534 (FIG. 17) and extends circumferentially around the tank interior 1532 (FIG. 18). As shown in FIG. 19, each of the internal frames 1560 is a metal plate extending in a plane transverse to the longitudinal axis L of the tank 1520. The use of a plate instead of another type of structural member is thought to reduce the total weight of each internal frame 1560. In the illustrated embodiment, the central internal frames 1560 are substantially identical. But in other embodiments the central internal frames can have different shapes and arrangements without departing from the scope of the invention.

In addition to the central internal frames 1560, the illustrated tank includes front and rear internal frames 1562, 1564 that are longitudinally aligned with the respective front joint area 1550 and rear joint area 1552. Like the central internal frames 1560, the front and rear internal frames 1562, 1564 are formed from metal plates extending in respective planes oriented transverse to the longitudinal axis L of the tank 1520. As will be discussed in further detail below, the front and rear internal frames 1562, 1564 do not extend through the tank interior 1532 along the bottom end of the tank. Instead, other, external structure reinforces the bottom end of the tank at the front and rear joint areas 1550, 1552.

As shown in FIG. 18, each central internal frame 1560 is a multi-piece assembly comprising distinct frame members that are joined together at respective joints. In the illustrated embodiment, the internal frame 1560 comprises a central frame member, a bottom frame members 1574, and a top frame member 1578. Using a multi-piece assembly for the internal frame members 1560 greatly reduces manufacturing costs in comparison with forming the internal frame members as a single piece. But it will be understood that one-piece frames can also be used without departing from the scope of the invention.

In general, the central frame member 1570, bottom frame member 1574, and top frame member 1578 are joined together to define a frame 1560 that extends circumferentially around the tank interior 1532 in substantially continuous contact with the tank wall 1530 and hopper joint area 1534. The central frame member 1570 forms a side portion of the central internal frame 1560 extending along the first side wall portion 1544 of the tank wall 1530 and another side portion of the central internal frame that extends along the second side wall portion 1546. The central frame member 1570 is preferably joined to the first and second side wall portions 1544, 1546, respectively, such as by welding. The bottom frame member 1574 forms a bottom portion of the central internal frame 1560 that extends along the respective hopper joint area 1534. The top frame member 1578 similarly forms a top portion of the central internal frame 1560 that extends along the top wall portion 1548. Like the central frame member 1570, the bottom and top frame members 1574, 1578 are preferably joined to the respective segments of the tank 1520, for example by welding.

Along with being joined to the tank 1520, the illustrated frame members 1570, 1574, 1578 are joined to one another by welding. In other embodiments, frame members can be joined together in other ways without departing from the scope of the invention. One skilled in the art will appreciate that, when two pieces are joined together at a welded joint, the resulting assembly is generally weakest near the location of the weld. To ensure the central internal frame assembly 1560 withstands the forces imparted upon the tank 1520 by internal pressures, the frame members 1570, 1574, 1578 are joined together at joint locations where the tank experiences lower stress when under internal pressure.

Several exemplary joint locations will now be briefly described. The bottom frame member 1574 is joined to the lower end of one side of the central frame member 1570 at a first lower side joint 1584. The first lower side joint 1584 is spaced apart above the high point of the of the hopper joint area 1534 near the first side wall portion 1544. The bottom frame member 1574 is also joined to the central frame member 1570 at a second lower side joint 1586. The second lower side joint 1586 is located spaced apart above the high point of the hopper joint area 1534 near the second side wall portion 1546. The central frame member 1570 is joined to the top frame member 1578 at a first upper side joints 1588 located adjacent the intersection between the top wall portion 1548 and the first side wall portions 1544 and a second upper side joint 1590 located adjacent the intersection between the top wall portion 1548 and the second side wall portion 1546. The locations of the joints 1584, 1586, 1588, 1590 at the lower corners and upper corners of the tank 1520 are thought to align with locations around the circumference of the tank 1520 that experience relatively less stress when the tank 1520 is pressurized to facilitate unloading of fluidizable product.

Besides locating the joints at low stress locations around the tank 1520, the illustrated central internal frame member is also shaped and arranged to provide greater reinforcement to high stress tank locations. In the illustrated embodiment, the width of the internal frame member 1560 varies as it extends circumferentially around the tank interior 1532. At the bottom portion of the central internal frame 1560, where internal pressure is thought to exert a relatively high amount of stress on the tank 1520, the frame has a relatively large width. Along the top and sides of the tank 1520, where internal pressure is thought to exert a relatively low amount of stress on the tank 1520, the frame has a smaller width. By using less reinforcing material at locations of the tank 1520 that experience lower stress, the total weight of each central internal frame 1560 is reduced. In contrast with heavier framing, the lightweight central internal frames 1560 are thought to improve the fuel efficiency of the trailer 1510.

In addition to extending circumferentially around the tank interior 1532, the central internal frame 1560 also includes a cross joist portion 1580. The cross joist portion 1580 extends laterally between the side wall portions 1544, 1546 of the tank wall 1530 at a location spaced apart between a bottom and top portions of the internal frame 1560. Preferably, the cross joist portion 1580 of the central internal frame 1560 is vertically spaced apart from the bottom end portion of the hoppers 1524 by at least two-thirds of the tank height H. For example, the cross joist portion 1580 can be spaced apart above the lower side joints 1584, 1586 such that the lower side joints are spaced apart between the cross joist portion and the high points of the respective hopper joint area 1534. In the illustrated embodiment, the central frame member 1570 has an inverted U-shape and forms the cross joist portion 1580. But in other embodiments, it is contemplated that, for example, the top frame member could define the cross joist portion without departing from the scope of the invention.

While the central internal frames 1560 are shaped to define the cross joist portion 1580 and extend circumferentially around the tank interior 1532, the front and rear internal frames 1562, 1564 are shaped differently to accommodate material located in the front and rear end portions of the tank interior 1532. Because the central internal frames 1560 are aligned with hopper joint areas 1534, the first and second lower frame members 1574, 1576 do not block material from flowing freely into the hoppers 1524. The material can flow to one side or the other of each central internal frame 1560 into a respective hopper 1524. The front and rear internal frames 1562, 1564 are, however, located at the front and rear hopper joint areas 1550, 1552, respectively. If a frame member were to extend in the bottom of the tank interior 1532 along the front hopper joint area 1550, it would block material located forward of the joint area from flowing into the front hopper 1524. Likewise, if a frame member were to extend in the bottom of the tank interior 1532 along the rear hopper joint area 1552, it would block material located rearward of the rear joint area from flowing into the rear hopper 1524.

Figure 20:
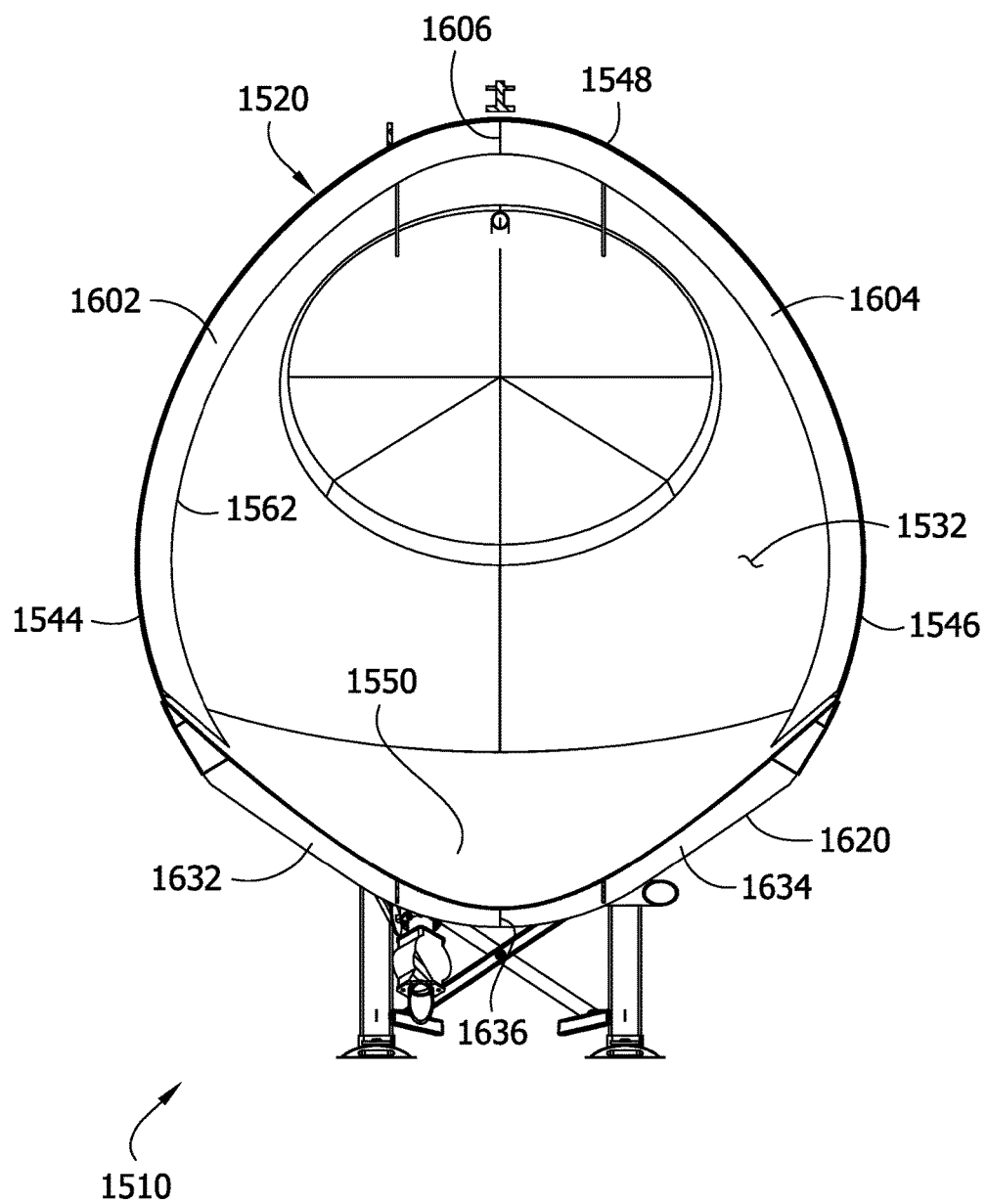
FIG. 20 is a section taken in the plane of line 20-20 of FIG. 16.
Figure 21:
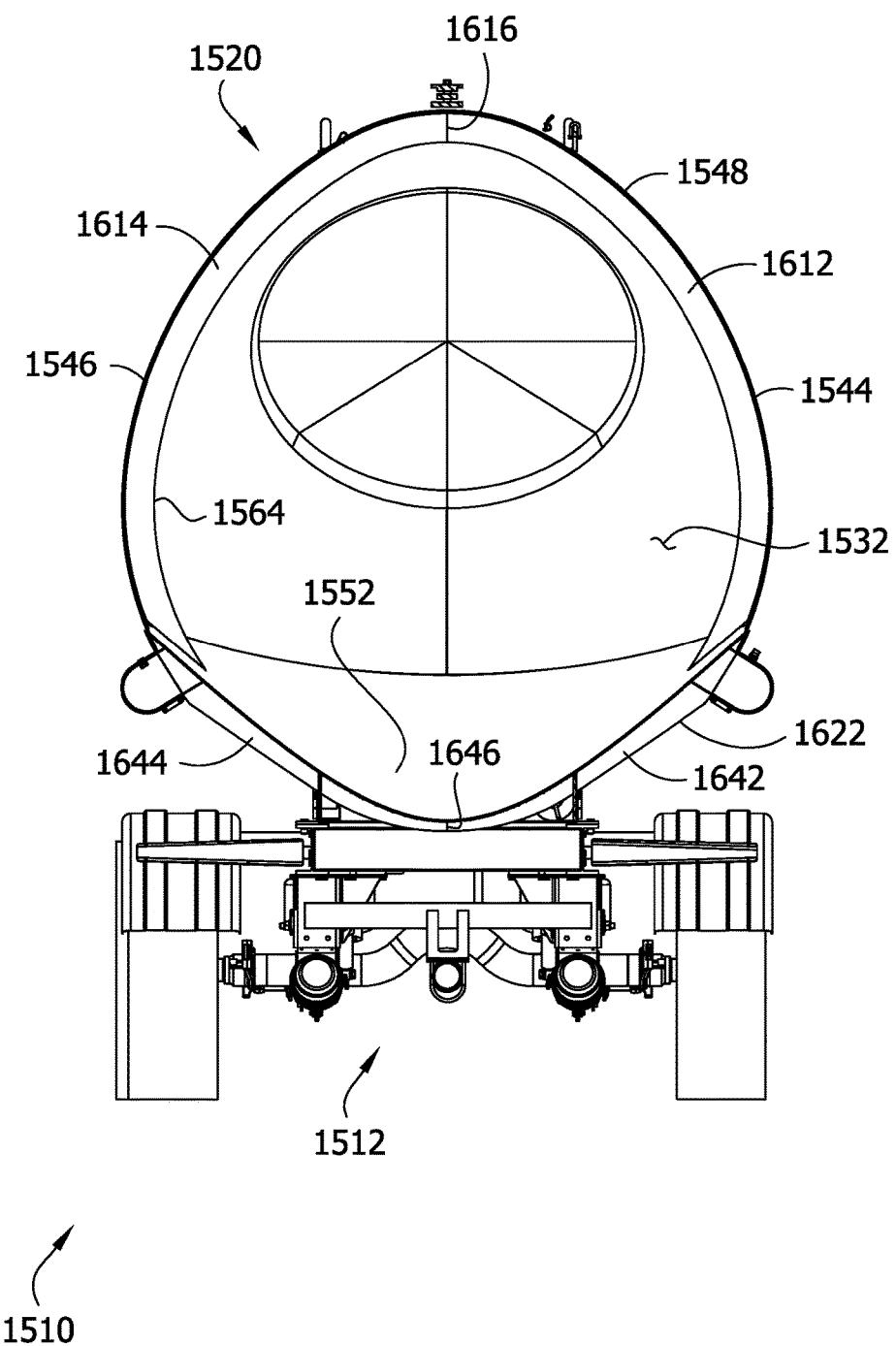
FIG. 21 is a section taken in the plane of line 21-21 of FIG. 16.

To permit free flow of material into the hoppers from substantially any location within the tank interior 1532, the front and rear internal frames 1562, 1564 are arch-shaped, lacking a bottom end portion that extends through the tank interior along the bottom end of the tank 1520. As shown in FIG. 20, the front internal frame 1562 is joined to the tank 1520 (e.g., by welding) and extends inside the tank along the first side wall portion 1544, top wall portion 1548, and second side wall portion 1546. As shown in FIG. 21, the rear internal frame 1564 is joined to the tank 1520 (e.g., by welding) and extends inside the tank along the first side wall portion 1544, top wall portion 1548, and second side wall portion 1546. The front and rear internal frames 1562, 1564 do not, however, extend along the bottom interior surface of the tank at the front and rear hopper joint areas 1550, 1552. Instead, as shown in FIG. 19, the bottom interior surface of the tank 1520 adjacent the front and rear hopper joint areas 1550, 1552 slopes substantially unobstructed from the front and rear ends of the tank to the bottom ends of the front and rear hoppers 1524.

In the illustrated embodiment, the front and rear internal frames 1562, 1564 are multi-piece assemblies. As shown in FIG. 20, the front internal frame 1562 includes a first frame member 1602 that extends along the first side wall portion 1544 and a segment of the top wall portion 1548 and a second frame member 1604 that extends along the second wall portion 1546 and another segment of the top wall portion of the tank. The first and second front internal frame members 1602, 1604 are joined to the tank 1520 and to one another at a joint 1606 (e.g., by welding) to form the front internal frame 1562. The joint 1606 is located at the top of the tank 1520, midway between the side wall portions 1544, 1546, where relatively low stress is thought to be imparted on the tank by internal pressure. As shown in FIG. 21, the rear internal frame 1564 includes a first frame member 1612 that extends along the first side wall portion 1544 and a segment of the top wall portion 1548. A second frame member 1614 extends along the second wall portion 1546 and another segment of the top wall portion 1548. The first and second rear internal frame members 1612, 1614 are joined to the tank 1520 and to one another at a joint 1616 (e.g., by welding) to form the rear internal frame 1564. The joint 1616 is located at the top of the tank 1520, midway between the side wall portions 1544, 1548, where relatively low stress is thought to be imparted on the tank by internal pressure.

Although, to avoid obstructing material flow into the hoppers 1524, the front and rear internal frames 1562, 1564 do not extend along the front and rear hopper joint areas 1550, 1552, it is preferable to still provide other reinforcement of the bottom side of the tank 1520. Referring to FIGS. 20 and 21, the illustrated trailer 1510 includes front and rear external frames 1620, 1622 that reinforce the tank 1520 at the front and rear hopper joint areas 1550, 1552. The front external frame 1620 is aligned with the front internal frame 1562 along the longitudinal axis L of the trailer 1510. In the illustrated embodiment, the front external frame 1620 is a metal plate extending substantially in the same plane as the front internal frame 1562. In the illustrated embodiment, the front external frame 1620 is connected to the front internal frame 1562 by the wall of the tank 1520 at the front joint area 1550. Together the internal and external frames 1562, 1620 form a front frame that extends circumferentially around the tank interior 1532 at the front hopper joint area 1550. The rear external frame 1622 is, likewise, aligned with the rear internal frame 1564 along the longitudinal axis L of the trailer 1510. In the illustrated embodiment, the rear external frame 1622 is a metal plate extending in substantially the same plane as the rear internal plate 1564. The rear external frame 1622 is only connected to the rear internal frame 1564 by the wall of the tank 1520 at the rear joint area 1552. Together the internal and external frames 1564, 1622 form a rear frame that extends circumferentially around the tank interior 1532 at the rear hopper joint area 1552.

As shown in FIG. 20, the front external frame 1620 includes first and second frame members 1632, 1634 that extend downward from the front hopper joint area 1550. The first frame member 1632 extends from one end at the high point of the front hopper joint area 1550 adjacent the first side wall portion 1544 to an opposite end at the low point of the front hopper joint area. Likewise the second frame member 1634 extends from one end at the high point of the front hopper joint area 1550 adjacent the second side wall portion 1546 to an opposite end at the low point of the front hopper joint area. The ends of the frame members 1632, 1634 located at the low point of the front hopper joint area 1550 are joined together at a joint 1636 located about midway between the first and second side wall portions 1544, 1546, where stresses on the tank caused by internal pressures are thought to be low. The joint 1636 can be formed by welding the frame members 1632, 1634 together or by any other suitable method. In addition, the frame members 1632, 1634 can be joined to the tank 1520 by welding or any other suitable method.

As shown in FIG. 21, the rear external frame 1622 includes first and second frame members 1642, 1644 that extend downward from the rear hopper joint area 1552. The first frame member 1642 extends from one end at the high point of the rear hopper joint area 1552 adjacent the first side wall portion 1544 to an opposite end at the low point of the rear hopper joint area. Likewise the second frame member 1644 extends from one end at the high point of the rear hopper joint area 1552 adjacent the second side wall portion 1546 to an opposite end at the low point of the rear hopper joint area. The ends of the frame members 1642, 1644 located at the low point of the rear hopper joint area 1552 are joined together at a joint 1646 located about midway between the first and second side wall portions 1544, 1546, where stresses on the tank 1520 caused by internal pressures are thought to be low. The joint 1646 can be formed by welding the frame members 1642, 1644 together or by any other suitable method. In addition, the frame members 1642, 1644 can be joined to the tank 1520 by welding or any other suitable method.

In the illustrated embodiment, the external frames 1620, 1622 are positioned at locations that are thought to have a minimal impact on the drag coefficient of the trailer 1510 in use. The front external frame 1620 extends externally of the tank 1620 at a location that is substantially covered by a tractor (not shown) connected to the trailer 1510 and/or a trailer nosecone 1650 (FIG. 15). When a tractor pulls the trailer 1510 in the forward direction, the rear external frame 1622 is located in a low pressure zone in the immediate wake of the tank 1520, where it causes minimal drag. Thus, the external frames 1620, 1622 suitably reinforce the bottom of the tank 1620 at the front and rear hopper joint areas 1550, 1552 without obstructing the flow of materials into the hoppers 1524 or significantly increasing the drag coefficient of the trailer 1510.

As can be seen, the frames 1560, 1562, 1564, 1620, 1622 provide a lightweight structure for reinforcing the tank 1520 against internal pressures. The low weight of the reinforcing structure enhances the fuel efficiency of the trailer. In addition, the placement of the frames 1560, 1562, 1564, 1620, 1622 in the interior 1532 of the tank 1534 and in covered external locations lowers the drag coefficient of the trailer 1510. Thus, it is believed that several aspects of the illustrated tank structure improve the fuel efficiency of the trailer 1510 and lower the cost of using the trailer to transport material without compromising the strength of the tank 1520.

Figure 22:
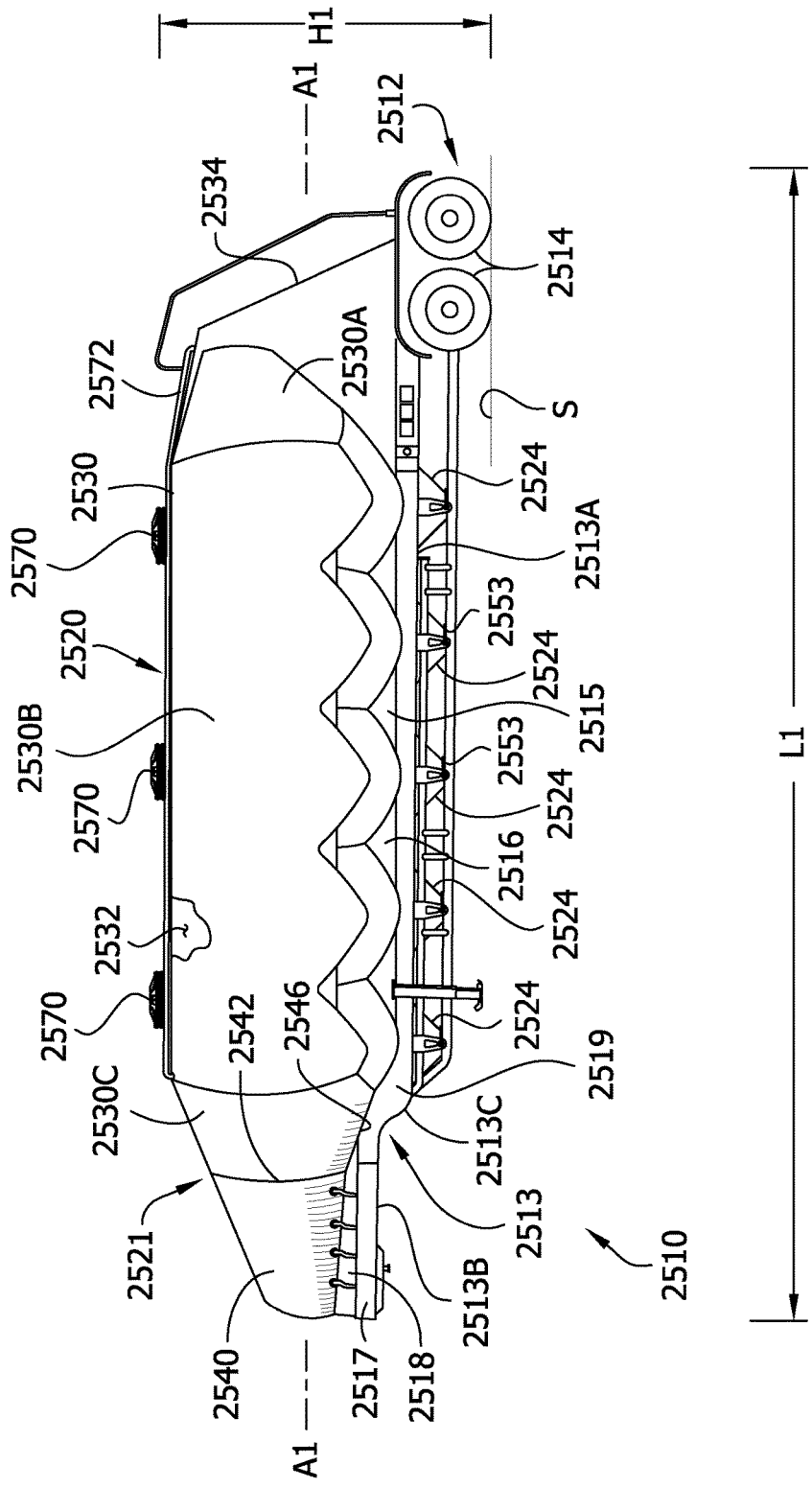
FIG. 22 is a side elevation of another embodiment of a pneumatic tank trailer.

Referring to FIG. 22, another embodiment of a pneumatic tank trailer is generally indicated at reference numeral 2510. The pneumatic tank trailer 2510 is similar in many respects to the trailers discussed above and can, in certain embodiments, include any of the features of the trailers discussed above. As will also be apparent, the trailers discussed above include several of the features described in detail below in reference to the trailer 2510. As above, the illustrated trailer 2510 has a front end and a rear end. A length L1 of the trailer 2510 extends between the front and rear ends of the trailer along a longitudinal axis A1. In the illustrated embodiment, the trailer 2510 has a length L1 of about 468 inches, but it will be understood that trailers can have other lengths in other embodiments. The longitudinal axis A1 of the trailer is generally parallel to a support surface S on which the trailer is positioned. For purposes of this description, the support surface S defines a horizontal reference, so the longitudinal axis A1 is considered to be oriented generally horizontal. In the illustrated embodiment, a central section of the top of the trailer 2510 that extends along the majority of the length L1 of the trailer is oriented generally parallel to the longitudinal axis A1. A height H1 of the trailer extends between this section of the top of the trailer 2510 and the support surface S. Throughout this disclosure, dimensions that use the support surface S as a reference assume that the trailer is unloaded and supported on standard tires that are inflated to a recommended inflation pressure. In one or more embodiments the height H1 of the trailer is from about 135 inches to about 147 inches (e.g., about 141 inches).

The trailer 2510 comprises a carriage, generally indicated at 2512, that includes a frame, generally indicated at 2513, and wheels 2514 mounted on the frame for rolling along the support surface S (e.g., moving the trailer over a road). As discussed in further detail below, the frame 2513 supports a tank 2520 of the trailer 2512, along with other components. The frame 2513 is located generally at a bottom end portion of the trailer 2510 and extends generally along the length L of the trailer. The frame 2513 includes a rear portion 2513A comprising parallel spaced apart beams 2515 (the left side beam 2515 conceals the right side beam in FIG. 22, but it is understood that the right side beam is a mirror image of the left side beam) that extend forward from the rear end of the trailer 2510 generally along the longitudinal axis A1. As discussed in further detail below, the use of spaced apart beams 2515 allows the trailer 2510 to discharge fluidizable material below the tank 2520 between the beams. Cladding 2516 extends up from the beams 2515 and is joined to the tank 2520 to cover gaps between the frame 2513 and tank 2420. A front portion 2513B of the frame 2513 also comprises parallel spaced apart beams 2517 (the left side beam 2517 conceals the right side beam in FIG. 22, but it is understood that the right side beam is a mirror image of the left side beam) that extend rearward from the front end of the trailer 2510 along the longitudinal axis A1. Cladding 2518 extends up from the front beams 2517 and is joined to a trailer nose portion, generally indicated at 2521, as discussed in further detail below. The front beams 2517 are offset the rear beams 2515 at a location higher than the rear beams. An intermediate connecting portion 2513C of the frame 2513 comprises a pair of parallel, spaced apart, jogged brackets 2519 (the left side bracket 2519 conceals the right side bracket in FIG. 22, but it is understood that the right side bracket is a mirror image of the left side bracket) that are attached to the front end portions of the rear beams 2515 and the rear end portions of the front beams 2517. The beams 2515, 2517 and brackets 2519 function as a rigid underlying support structure that supports the trailer 2510 in use. The trailer may have other support structures within the scope of the present invention.

Figure 23:
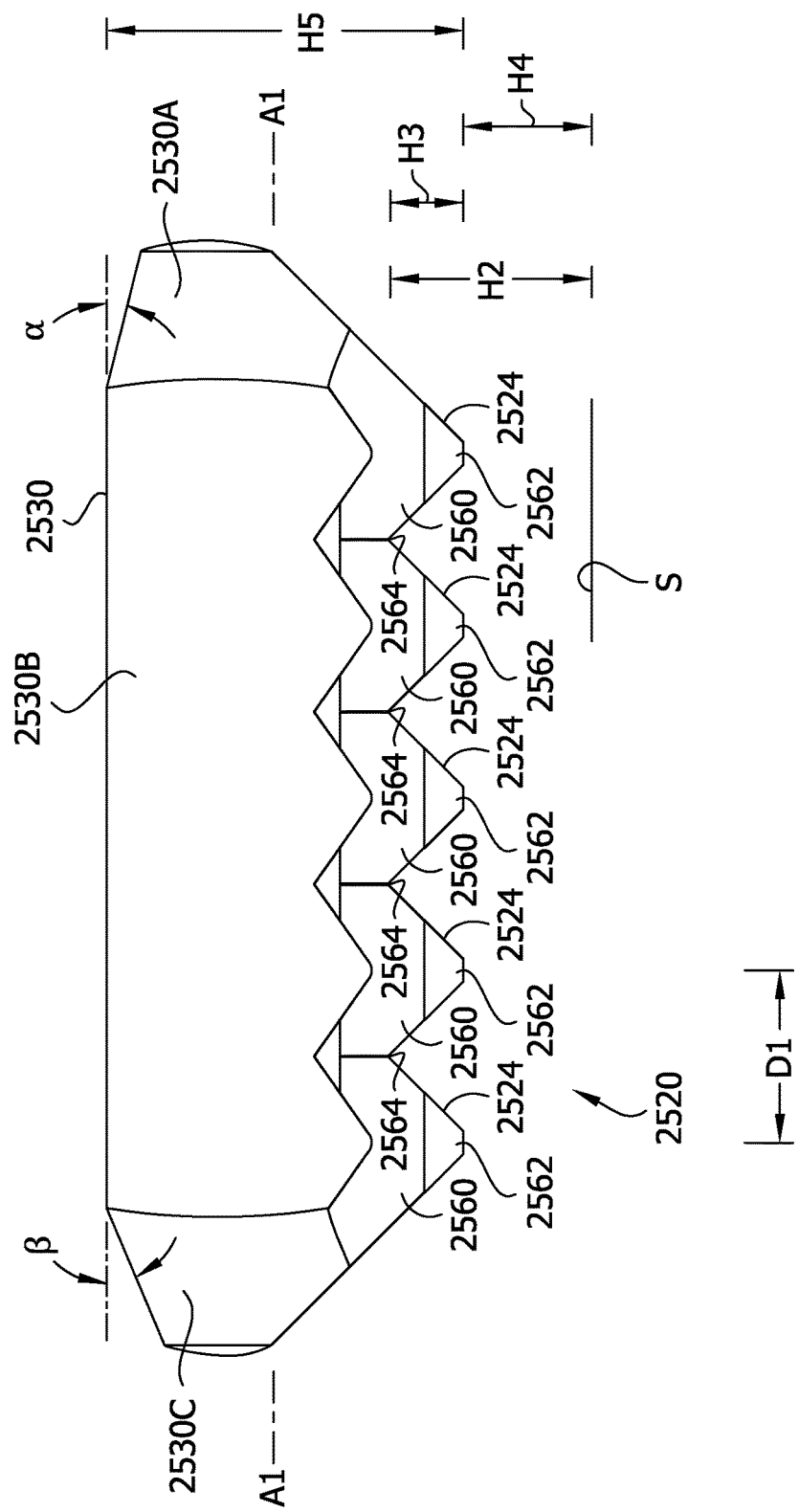
FIG. 23 is a side elevation of a tank of the trailer of FIG. 22.

The tank 2520 includes a plurality of hoppers 2524 that define a bottom end portion of the tank and a tank wall 2530 that extends up from the hoppers and defines an interior 2532 of the tank. The tank 2520 has a tank height H5, which extends from the bottoms of the hoppers 2524 to the top of the tank wall 2530 as shown in FIG. 23. In one or more embodiments, the tank height H5 is from about 115 inches to about 125 inches (e.g., about 120 inches), but other tanks can have other tank heights in other embodiments (e.g., from about 110 inches to about 130 inches, from about 100 inches to about 140 inches, etc.). The tank 2520 is configured to receive fluidizable material in the interior 2532 and to selectively discharge the material through openings (not shown) in the bottoms of the hoppers 2524. Moreover, the interior 2532 of the tank 2520 is configured to be pressurized to cause material to more easily and completely flow out of the hoppers 2524. Suitably, the tank 2520 can include internal reinforcement as discussed above in reference to the trailer 1510, which supports the tank against internal pressures while allowing the exterior shape of the tank to be relatively smooth because it is free from external reinforcement.

Figure 25:
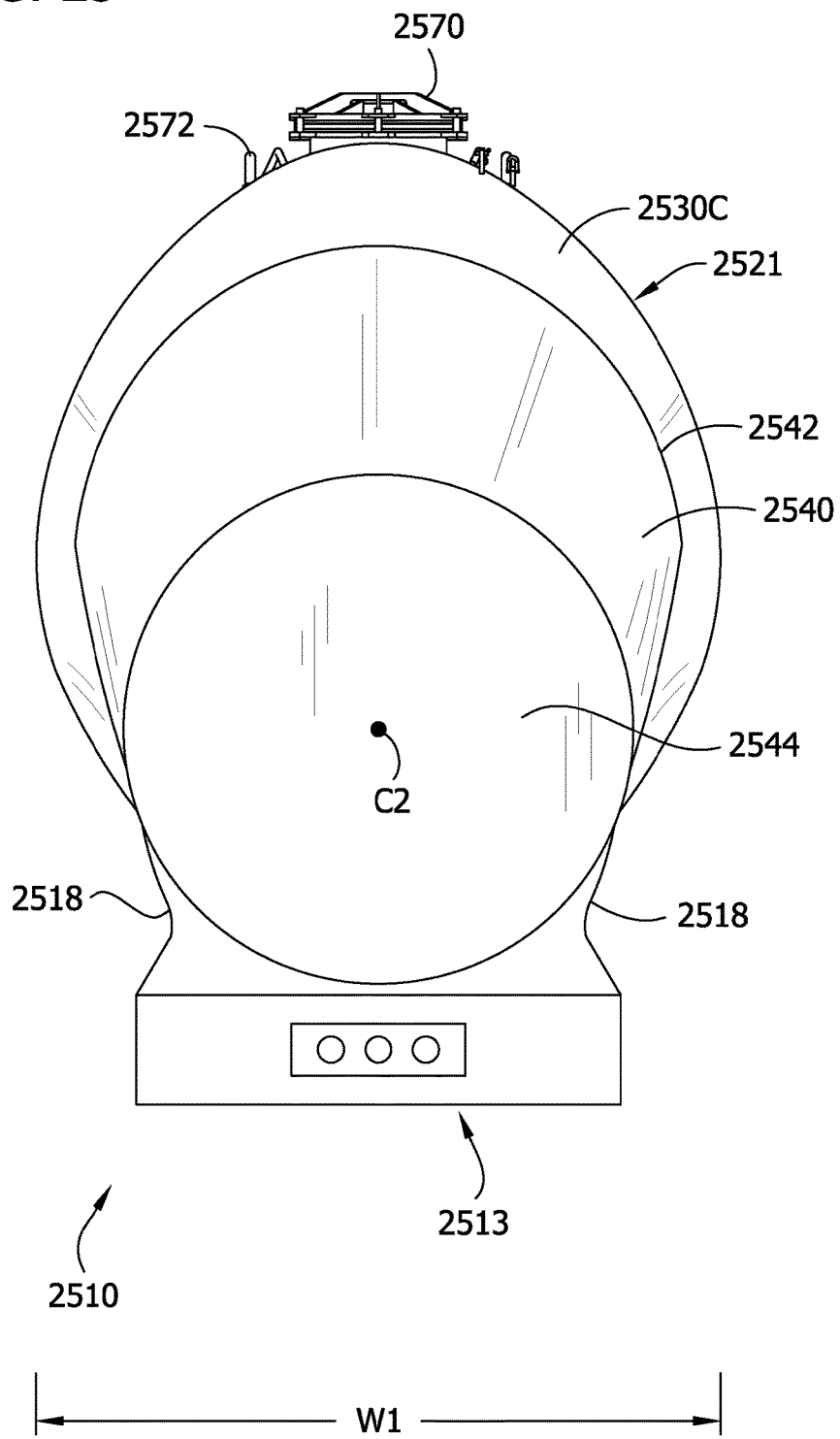
FIG. 25 is a front elevation of the trailer of FIG. 22, with an undercarriage removed for simplicity of illustration.
Figure 26:
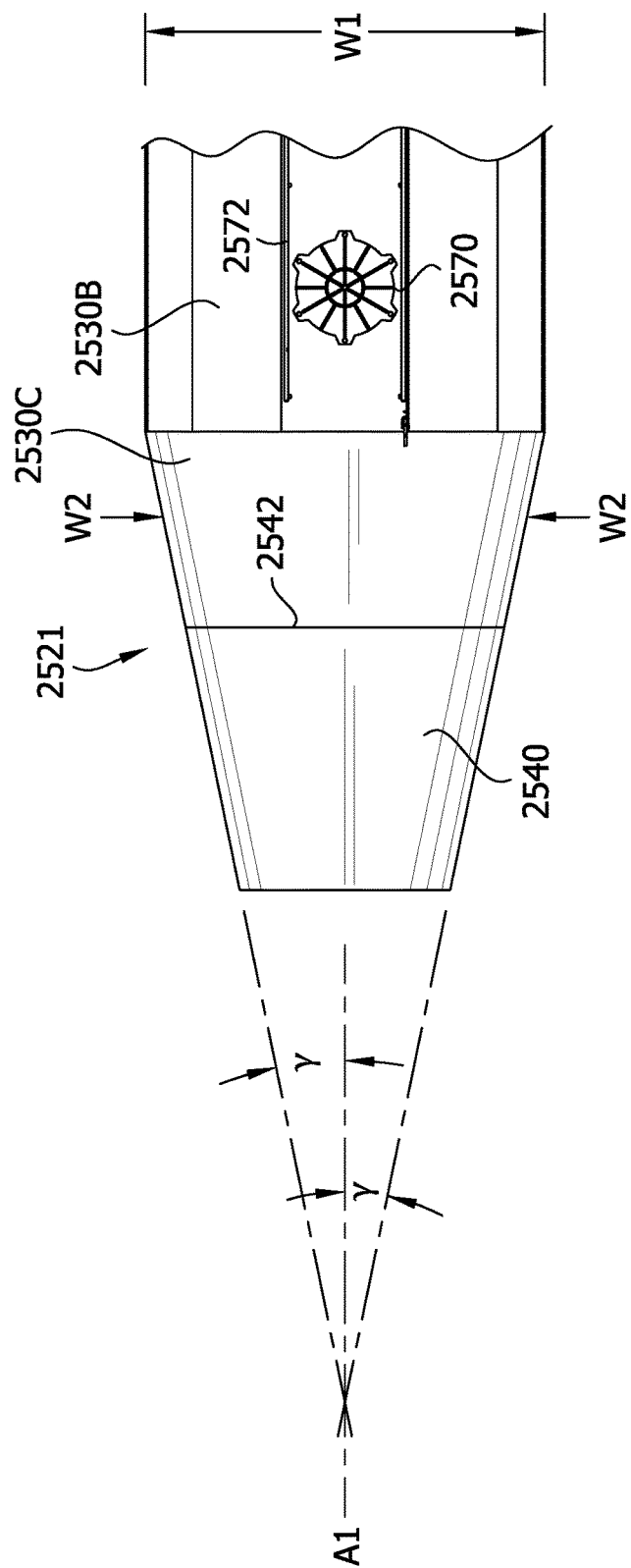
FIG. 26 is an enlarged fragmentary top plan view of a front end portion of the trailer of FIG. 25.

As shown in FIG. 23 the tank wall 2530 has a rear end portion 2530A, a central portion 2530B, and a front end portion 2530C. The central portion 2530B of the tank wall 2530 has a substantially constant cross-sectional shape that extends along the longitudinal axis A1 from a rear end to a front end. As shown in FIGS. 25 and 26, the central portion 2530B has a width W1 and is the widest portion of the trailer 2510. In one or more embodiments, the maximum trailer width W1 is from about 95 inches to about 109 inches (e.g., about 102 inches). Referring again to FIG. 23, the top of the central portion 2530B extends generally parallel to the longitudinal axis A1 (i.e., is substantially horizontal) and defines the height H1 of the trailer (FIG. 22). In the illustrated embodiment, the central portion 2530B of the tank wall 2530 is substantially free of external reinforcement. Thus, the central portion 2530B defines a substantially smooth exterior surface, which is thought to reduce the drag coefficient of the trailer.

The rear end portion 2530A of the tank wall 2530 has a rear end and a front end joined to the rear end of the central portion 2530B. The front end of the rear end portion 2530A begins at the rearmost point along the length of the tank 2520 that has the maximum width W1, and the rear end of the rear portion defines the rear end of the tank. The rear end portion 2530A has a round or arcuate cross-sectional shape whose cross-sectional dimensions decrease as it extends rearward from the front end thereof toward the rear end. That is, the top of the rear end portion 2530A slopes downward and the sides of the rear end portion angle inward as the rear end portion extends rearward along the longitudinal axis A1. Thus, the rear end portion 2530A of the tank wall 2530 has a generally conical shape in the illustrated embodiment. The cone shape of the rear end portion 2530A is suitably truncated such that the rear end is wider than a stair case 2534 that is attached to the rear end portion (FIG. 22). In the illustrated embodiment, the exterior surface of the rear end portion 2530A is generally smooth. For example, the rear end portion 2530A is free from external reinforcement. As shown in FIG. 23, the top of the rear end portion is oriented at a skew angle α relative to the longitudinal axis A1 of from about 2° to about 25° (e.g., about 12°, about 15°, about 21°, etc.). The smooth, tapering conical shape of the rear end portion 2530A is thought to provide the tank 2520 with a streamlined shape that lowers the drag coefficient of the trailer 2510.

Figure 28:
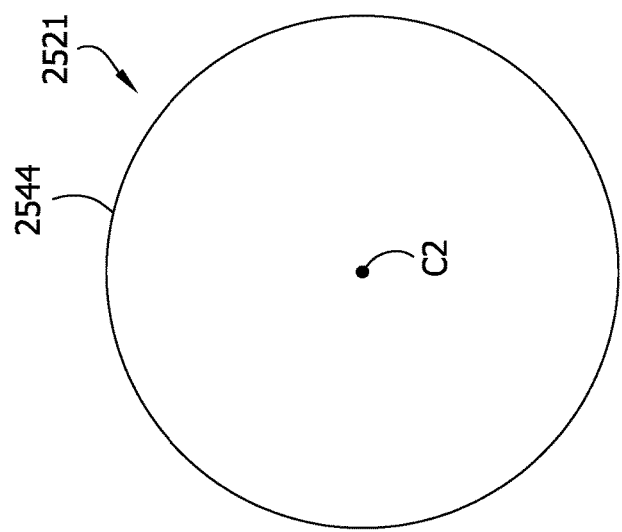
FIG. 28 is a schematic cross-section of a front end cap of the nose portion of the trailer of FIG. 22 illustrating the location of a center point thereof, the schematic cross-sections of FIGS. 27 and 28 being shown side-by-side to illustrate the relative positions of the center points of the rear end of the nose portion and the front end cap of the nose portion.
Figure 27:
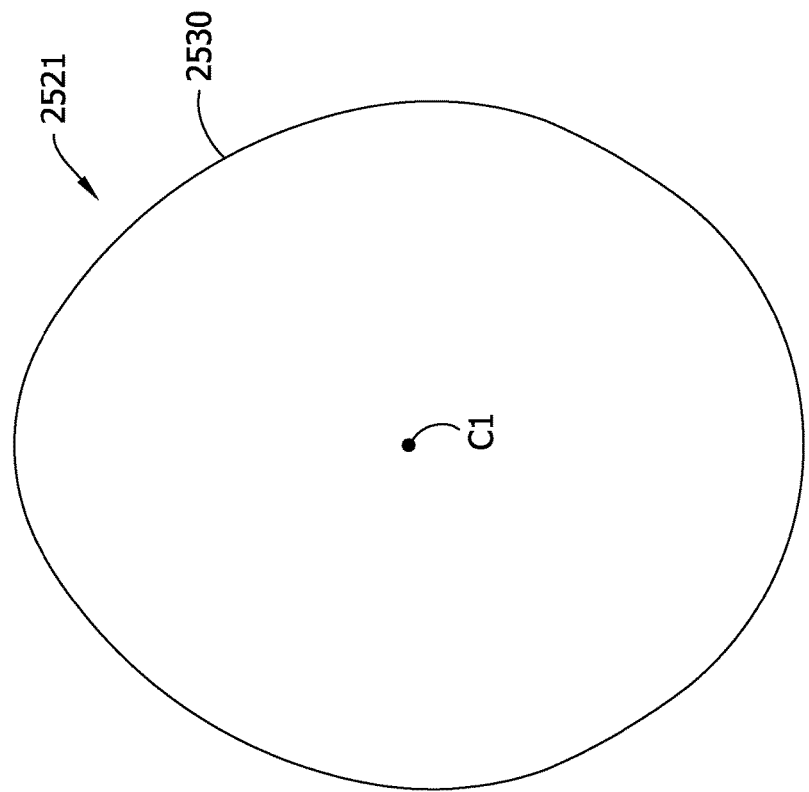
FIG. 27 is a schematic cross-section of a rear end of the nose portion of the trailer of FIG. 22 illustrating the location of a center point thereof.

Like the rear end portion 2530A, the front end portion 2530C of the tank wall 2530 has a generally conical shape. As will be discussed in further detail below, the front end portion 2530C of the tank wall 2530 forms a rear segment of the conical nose portion 2521 of the trailer 2510 in the illustrated embodiment. The front end portion 2530C has a front end and an opposite rear end joined to the front end of the central portion 2530B. The rear end of the front end portion 2530C (which defines the rear end of the nose portion 2521 in the illustrated embodiment) is located at the front-most point along the length of the tank 2520 that has the maximum width W1, and the front end of the front portion defines the front end of the tank. As shown in FIGS. 27 and 28 the rear end of the front end portion 2530C has a cross-sectional center point C1 that is spaced apart along the height H1 of the trailer 2510 from a cross-sectional center point C2 of a front end cap 2544 of the trailer 2510. Referring again to FIG. 23, the front end portion 2530C has a round or arcuate cross-sectional shape whose cross-sectional dimensions decrease as it extends forward from the rear end toward the front end. That is, the top of the front end portion 2530C slopes downward as it extends forward and the sides of the front end portion angle inward as they extend forward. In one or more embodiments, the top of the front end portion 2530C is oriented at a skew angle β relative to the longitudinal axis A1 of from about 19° to about 23° (e.g., about 21°). In other embodiments, the top of the front end portion 2530C may also be oriented at other skew angles β relative to the longitudinal axis A1 (e.g., from about 17° to about 25°, from about 15° to about 25°, from about 12° to about 27°, from about 10° to about 30°, etc.). Like the rear end portion 2530A, the cone shape of the front end portion 2530C is truncated. In the illustrated embodiment, the exterior surface of the front end portion 2530C is generally smooth. For example, the front end portion 2530C is free of external reinforcement.

Figure 24:
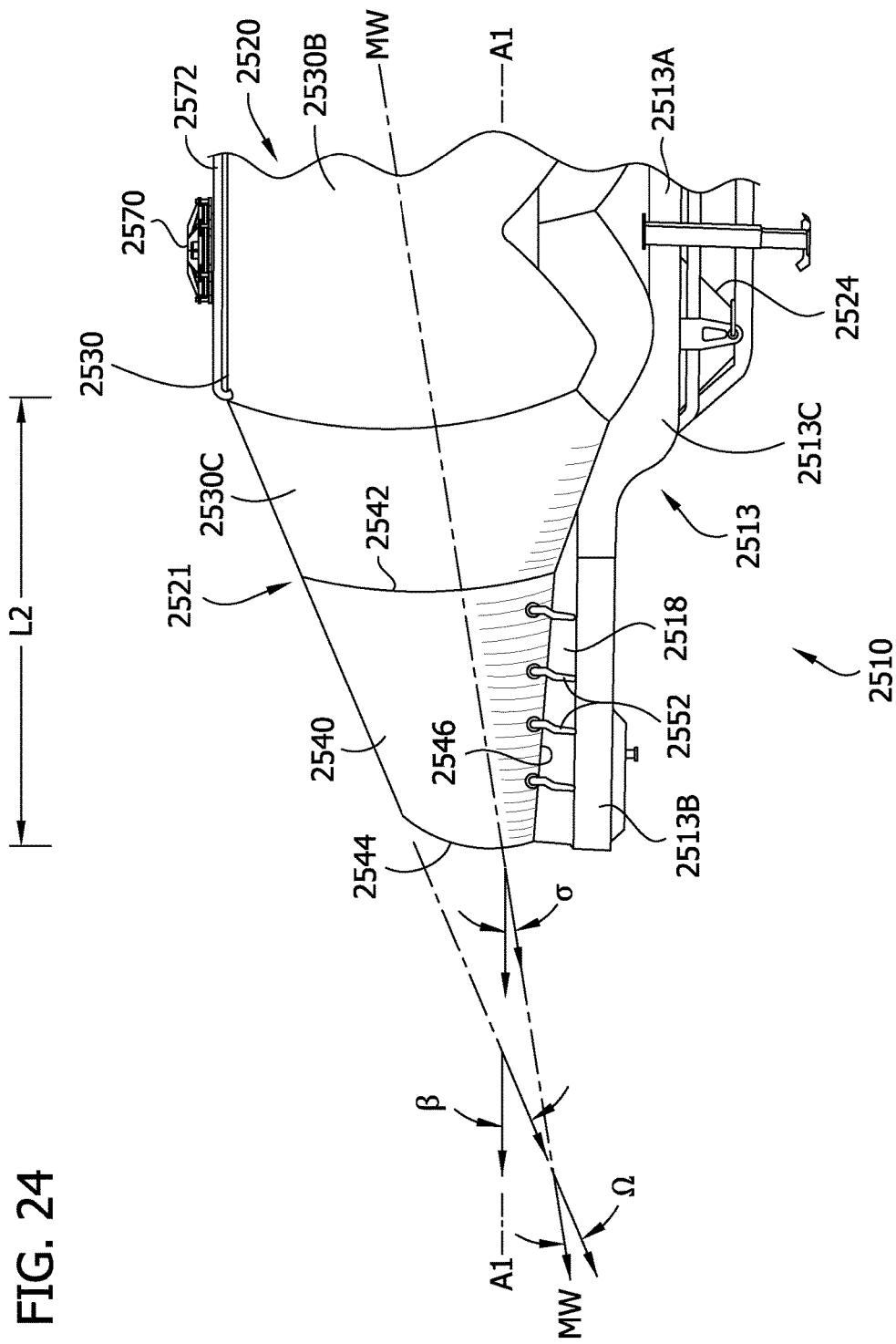
FIG. 24 is an enlarged fragmentary side elevation of a front end portion of the trailer of FIG. 22.

Referring to FIGS. 24-26, the front end portion 2530A of the tank wall 2530 forms a rear segment of the nose portion 2521 of the trailer 2510, and a nose covering 2540 is joined to the front end portion 2530C to form a front segment of the nose portion. For example, in one or more embodiments, the front end portion 2530C of the tank wall 2530 is partially received in the nose covering 2540. The nose covering 2540 has a rear end, which is joined to front end portion 2530C of the tank wall 2530 at a joint 2542, and a front end spaced apart from the rear end along the longitudinal axis A1. Like the front end portion 2530A of the tank wall 2530, the nose covering 2540 has a generally round or arcuate cross sectional shape whose cross-sectional dimensions decrease as it extends forward. Thus, the nose covering 2540 is generally conical. The front end of the nose covering 2540 is truncated and has a dome-shaped end cap 2544 oriented transverse to (e.g., generally perpendicular to) the longitudinal axis A1 of the trailer 2510. The cross sectional center point C2 is the cross-sectional center point of the end cap 2544 (FIG. 28).

In the illustrated embodiment, the nose covering 2540 smoothly transitions from the front end portion 2530C of the tank wall 2530 such that the nose portion 2521 of the trailer 2510 is generally smooth and conically shaped. As shown in FIG. 24, the nose covering 2540 has a top that slopes downwardly at the skew angle β relative to the longitudinal axis A1. Thus, there is no substantial change in the slope of the top of the nose portion 2521 across the transition from the tank wall 2530 to the nose covering 2540. When viewed from above as shown in FIG. 26, there is likewise substantially no change in the orientation of the sides of the nose portion 2521 across the transition from the tank wall 2530 to the nose covering 2540. Thus, a width W2 of the nose portion tapers inward at a substantially constant angle as the nose portion extends from the rear end to the front end thereof (e.g., from the rear end of the front tank wall portion 2530C to the front end of the nose covering 2540). In the illustrated embodiment, the sides of the nose portion 2521 are generally symmetrical about the longitudinal axis A1 and are oriented at an angle γ with respect to the longitudinal axis (FIG. 26). In one or more embodiments, the angle γ is from about 10° to about 16° (e.g., about 13°). In other embodiments the sides of the nose portion 2521 may be formed at other angles γ with respect to the longitudinal axis A1 (e.g., from about 8° to about 18°, from about 5° to about 21°, from about 2° to about 24°, etc.). The nose portion 2521 thus defines a generally frusto-conical structure at the leading end of the trailer 2510. Although the nose portion 2521 of the trailer 2510 is formed by a front end portion 2530C of the tank wall 2530 and a separately attached nose covering 2540, in other embodiments a unitary nose covering or tank wall portion can form the conical nose portion.

Referring again to FIG. 24, a bottom side of the frusto-conical shaped nose portion 2521 is truncated so as not to interfere with the king pin (not shown). For example, the bottom end of each side the nose portion 2521 (only the left side of the nose portion is shown in FIG. 24, but it is understood that the right side is a mirror image of the left side) is joined to the frame 2513 at each side of the trailer 2510. More specifically, the bottom end of the nose portion 2521 is joined to the cladding 2518 on each side of the trailer at a joint 2546. In the illustrated embodiment, the joints 2546 slope downward as they extend rearward. A front segment of each joint 2546 (e.g., which extends along the length of the nose covering 2540) slopes more gradually than a rear segment (e.g., which extends along a portion of the length of the tank wall 2530). In the illustrated embodiment, the cladding 2518, the front tank wall portion 2530C, and the nose covering 2540 define a substantially enclosed nose portion 2521 above the frame 2513. By enclosing the exterior of the nose portion 2521 using relatively smooth surfaces, the drag coefficient of the trailer is thought to be reduced.

The nose portion 2521 of the trailer 2510 has a length L2, which extends from the rear end of the front end portion 2530C of the tank wall 2530 to the front end of the front end cap 2544. In the illustrated embodiment, the nose portion length L2 is about 120 inches. But it is contemplated that other nose portions could have other lengths L2 in other embodiments (e.g., from about 115 inches to about 125 inches, from about 110 inches to about 130 inches, from about 100 inches to about 140 inches, from about 90 inches to about 150 inches, from about 80 inches to about 120 inches, etc.). In one or more embodiments, the length L2 of the nose portion 2521 is at least about 15% of the length L1 of the trailer (e.g., greater than or equal to about 17% of the trailer length L1, greater than or equal to about 20% of the trailer length, greater than or equal to about 22.5% of the trailer length, such as about 25% of the trailer length). In the illustrated embodiment, the length L2 is about 22% of the total length of the trailer. For example, the cross sectional dimensions of the trailer 2510 decrease as they extend forward along at least the front 15% of the length L1 of the trailer (e.g., the top of the trailer slopes forward along at least the front 15% of the length of the trailer and/or the sides of the trailer are angled inward along at least the front 15% of the length of the trailer (FIG. 26)). Using a smooth, conical nose portion 2521 that has a length L2 that extends a considerable portion of the length L1 of the trailer 2510 has been found to reduce the drag coefficient of the trailer, which enhances the fuel efficiency of the trailer in use. The shallow angle of the surface of the nose portion redirects air from between the tractor cab and trailer very gradually around the trailer.

In the illustrated embodiment, the conical nose portion 2521 has a downwardly sloping orientation similar to a cone having a cone axis that is skewed downward relative to a horizontal axis as it extends from the base end of the cone to the tip end of the cone. As shown in FIG. 24, the downwardly sloping orientation of the nose portion 2521 can be defined in relation to a maximum width plane MW of the nose portion. When viewed from above as shown in FIG. 26, the maximum width W2 of the nose portion 2521 is the length measured in a plane perpendicular to the axis A1 of the trailer 2510 between the upper boundary of the nose portion and the lower boundary of the nose portion at a given location along the length of the nose portion (e.g., the lines illustrating the sides of the nose portion 2521 in FIG. 26). Lines between the upper and lower boundaries of the nose portion 2521 define the maximum width of the nose portion 2521 along at least a front segment of the nose portion. These lines lie generally in the maximum width plane MW, illustrated in FIG. 24. In the illustrated embodiment, the points which define the maximum width of the nose portion 2521 along the nose covering 2540 lie generally in the maximum width plane MW. As can be seen in FIG. 24, the maximum width plane MW slopes downwardly as it extends forward along the length L2 of the nose portion 2521. Thus, the nose portion 2521 has a generally downwardly sloping orientation as defined by the downwardly sloping maximum width plane MW. The downwardly sloping orientation of the nose portion 2521 is such that the cross sectional center point C2 of the rear end of the nose portion is spaced apart above the cross-sectional center point C1 of the front end of the nose portion, as shown in FIGS. 27 and 28.

As shown in FIG. 24, the maximum width plane MW is oriented at a skew angle σ relative to the longitudinal axis A1. The maximum width plane skew angle σ is smaller than the nose portion top skew angle β. In one or more embodiments, the maximum width plane skew angle σ is from about 5° to about 9° (e.g., about 7°). In other embodiments, the maximum width plane MW may be oriented at other skew angles σ relative to the longitudinal axis A1 (e.g., from about 4° to about 10°, from about 2° to about 12°, from about 2° to about 15°, from about 1° to about 20°, etc.). The maximum width plane MW is also oriented at a skew angle Ω relative to the top of the nose portion 2521. In certain embodiments the skew angle Ω between the maximum width plane MW and the top of the nose portion 2521 is from about 12° to about 16° (e.g., about 14°). In other embodiments, the maximum width plane MW may be oriented at other skew angles Ω relative to the top of the nose portion 2521 (e.g., from about 10° to about 18°, from about 8° to about 20°, from about 6° to about 22°, from about 4° to about 24°, etc.).

Figure 29:
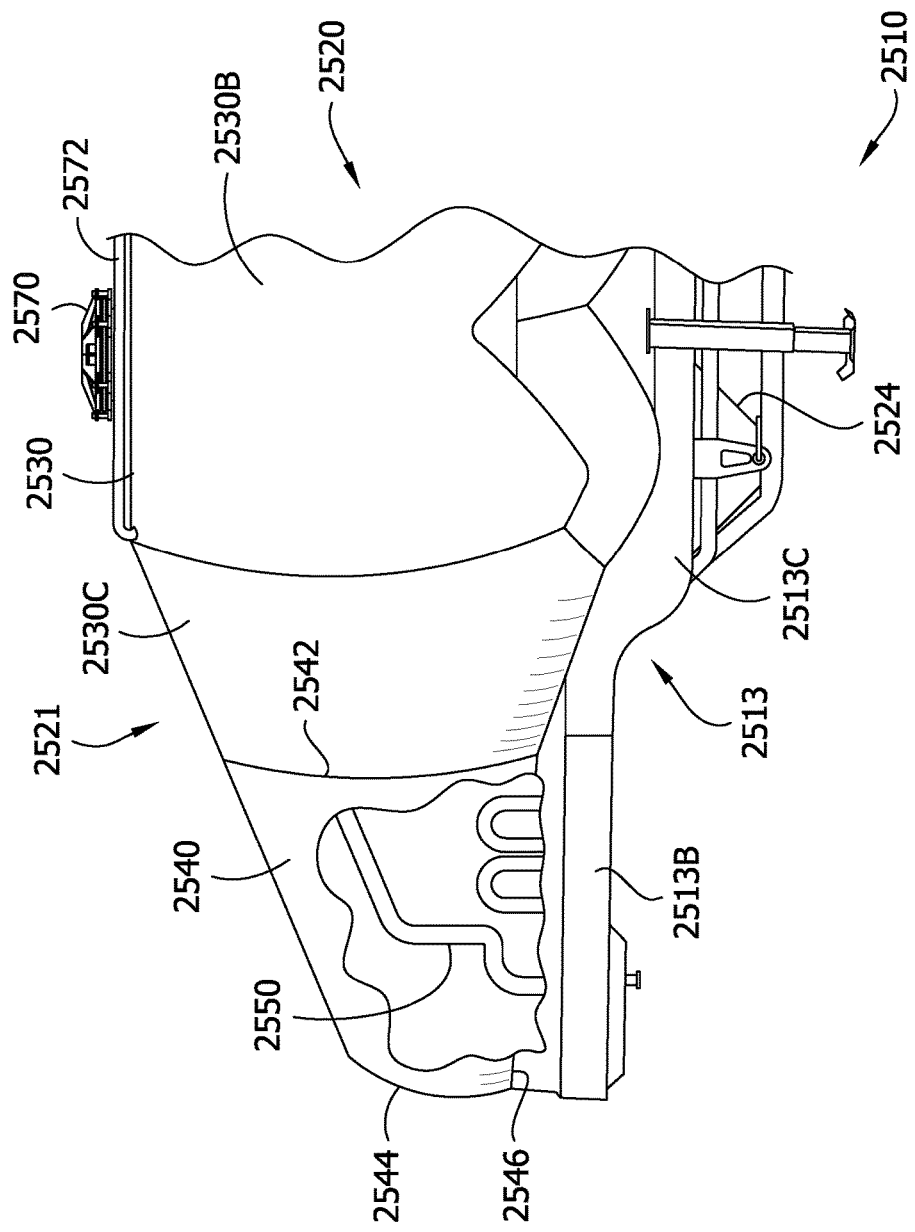
FIG. 29 is an enlarged fragmentary elevation similar to FIG. 24 having a portion of a nose covering broken away to reveal components of an unloading system of the trailer.

Referring to FIGS. 24 and 29, as is generally known in the art, the illustrated trailer 2510 includes an unloading system 2550. The unloading system 2550 is configured to selectively impart pressure into the tank interior 2524 and/or selectively open the hoppers 2524 to discharge fluidizable material received in the tank interior 2532 through the hoppers below the tank 2520. In the illustrated embodiment, a portion of the unloading system 2550 is located in front of the tank 2520. The nose covering 2540 covers the portion of the unloading system 2550 positioned in front of the tank 2520. A plurality of control actuators 2552 that are operatively connected to the unloading system 2550 extend through a side portion of the nose covering 2540, where they are accessible to an operator from the exterior of the trailer 2510. The operator can use the control actuators 2552 to selectively actuate the unloading system 2550, such as to blow the contents of the tank interior 2524 out through the hoppers 2524.

Referring again to FIG. 22, in the illustrated embodiment, the tank 2520 includes five separate hoppers 2524. Tanks with other numbers of hoppers can be used in other embodiments. Each hopper 2524 has a funnel portion 2560 and a discharge nozzle 2562 (FIG. 23). The hoppers 2524 extend downward between the right and left beams 2517 so that the nozzles 2562 are positioned below the beams to discharge material beneath the tank 2520. The funnel portions 2560 funnel the material in the tank 2520 through the nozzles 2562 as gravity and internal pressurization forces the material downward in the tank. Referring to FIG. 23, the funnel portion 2560 of each hopper 2524 slopes inward at an angle of about 45°. The funnel portions may be sloped at other angles (e.g., from about 40° to about 50°, from about 35° to about 55° inches, from about 30° to about 60°, etc.) without departing from the scope of the invention. For example, in one or more embodiments, an upper segment of the each funnel portion has a greater slope than a lower segment of each funnel portion, such as an upper segment that is sloped at about 50° and a lower segment that is sloped at about 30°. Each hopper 2524 suitably has an independent metering system that controls the flow of material through the nozzle 2562. Each metering system can suitably be controlled using the actuators 2553 (FIG. 22) at the nozzles 2562 or other actuators accessible from the exterior of the trailer 2510 (e.g., the actuators 2552).

As compared with the hoppers in conventional pneumatic tank trailers, the hoppers 2524 are positioned closer to one another. Referring still to FIG. 23, a distance D1 of about 62 inches separates each nozzle 2562 from the nozzles of the adjacent hoppers. Other distances D1 (e.g., from about 62 inches to about 64 inches, from about 61 inches to about 65 inches, from about 60 inches to about 66 inches, from about 59 inches to about 67 inches, from about 58 inches to about 68 inches, from about 57 inches to about 69 inches, etc.) may separate adjacent hopper nozzles without departing from the scope of the invention. In one embodiment, the number of hoppers 2524 is an integer greater than the length L1 of the trailer 2510 in feet, divided by 10. For example, the illustrated trailer 2510 may have a length L1 of about 44.75 feet and have five hoppers 2524. Thus in one example, the trailer is less than 50 feet in length and has five hoppers.

Because the hoppers 2524 are positioned closer to one another than the hoppers of conventional pneumatic tank trailers, they are also shorter 2560 than conventional hoppers. The intersection between adjacent hoppers 2524 forms a hopper crotch 2564. In FIG. 23, the frame 2513 has been removed to reveal the location of the bottoms of the hopper crotches 2564. In one embodiment, the bottom of the hopper crotch 2564 is located at a crotch height H2 of less than 54 inches (e.g., the height H2 is measured as the distance between the hopper crotch and the support surface S, the position of which in relation to the tank 2520 when mounted on the carriage 2512 is shown in FIG. 23). Suitably, the crotch height H2 can be less than about 40% of the height of the trailer (e.g., less than about 38% of the height H1, less than about 37% of the height H1, less than about 36% of the height H1, etc.). In another embodiment the hopper crotch 2564 has a height H2 of 50 inches or less (e.g., about 49 inches, or such as from about 47 inches to about 50 inches). Each hopper 2524 has a hopper height H3, which is measured between the discharge end of the nozzle 2562 and the hopper crotch 2564. In certain embodiments, the hopper height H3 of each hopper 2524 is less than about 35 inches (e.g., less than about 33 inches, less than about 31 inches, less than about 30 inches, less than about 29 inches, about 28 inches, etc.). Suitably, the hopper height H3 may be less than about 30% of the tank height H5 (e.g., less than about 28%, less than about 26%, less than about 25%, less than about 24%, about 23%, etc.). Configuring the tank 2520 to have a hopper height H3 that is a relatively small percentage of the tank height H5 lowers the center of gravity of the trailer 2510, which is thought to improve the fuel economy of a tractor pulling the trailer. The bottom ends of the nozzles 2562 have a nozzle height H4, measured as the distance between the discharge end of each nozzle and the support surface S. In one or more embodiments, the nozzle height H4 is about 21 inches. The nozzles of hoppers may be positioned at other nozzle heights H4 (e.g., less than about 24 inches, such as from about 20 inches to about 22 inches, from about 19 inches to about 23 inches, from about 18 inches to about 24 inches, etc.) without departing from the scope of the invention. The relatively short heights H2, H3, H4 of the hoppers 2524 lowers the center of gravity of the trailer 2510 when the tank 2520 is loaded with dry contents as compared with conventional pneumatic tank trailers. As a result, the trailer 2510 is more stable (e.g., less prone to rollover) than conventional pneumatic tank trailers. Moreover, the shorter hoppers 2524 have been found to improve the unloading efficiency tank 2520 as compared to the taller hoppers used in conventional pneumatic tank trailers. The shorter hoppers 2524 enable the bulk material to flow through the funnel portion 2560 with less restriction.

As shown in FIG. 23, the front end portion 2530C of the tank wall 2530 is joined to the top edge of the funnel portion 2560 of the front-most hopper 2524 along a front portion thereof. The tank wall rear end portion 2530A is likewise joined to the top edge of the funnel portion 2560 of the rearmost hopper 2524 along a rear portion thereof. Suitably, a lower segment of the front tank wall portion 2530C slopes rearward toward the front-most hopper 2524 at an angle of about 45°. Likewise, a lower portion of the rear tank wall portion 2530A slopes forward toward the rearmost hopper 2524 at an angle of about 45°. The front and rear walls of other tanks may be sloped at other angles (e.g., from about 40° to about 50°, from about 35° to about 55°, from about 30° to about 60°, etc.) without departing from the scope of the invention. The sloped lower segments of the front and rear tank wall portions 2530A, 2530C minimize dead space in the interior of the tank 2520 by directing materials downward toward the front and rear hoppers 2524.

Referring to FIG. 22, three manholes and manhole covers 2570 are spaced apart along the top of the tank 2520. Other numbers of manhole covers may also be used without departing from the scope of the invention. The manhole covers 2570 may be selectively opened to permit access to the tank interior or to load materials into the tank. The manhole covers 2570 may also be selectively closed. A forward-most one of the manhole covers 2570 is positioned adjacent the front end of the central tank wall portion 2530B, and a rearward-most one of the manhole covers is positioned adjacent the rear end of the central tank wall portion.

As discussed above, a staircase 2534 is mounted on the trailer frame 2513. The staircase 2534 provides safe access from the rear of the trailer 2510 to the top of the trailer, including access to the manhole covers 2570. Toe rails 2572 extend along the top surface of the tank 2520 and bound a walking path for a user accessing the manhole covers 2570. In one or more embodiments, air hoses (e.g., air hoses used for pneumatically opening and closing the manhole covers or for pressurizing the tank interior, etc.) extend through the toe rails 2572, so that such air hoses do not create additional drag on the trailer.

Figure 30:
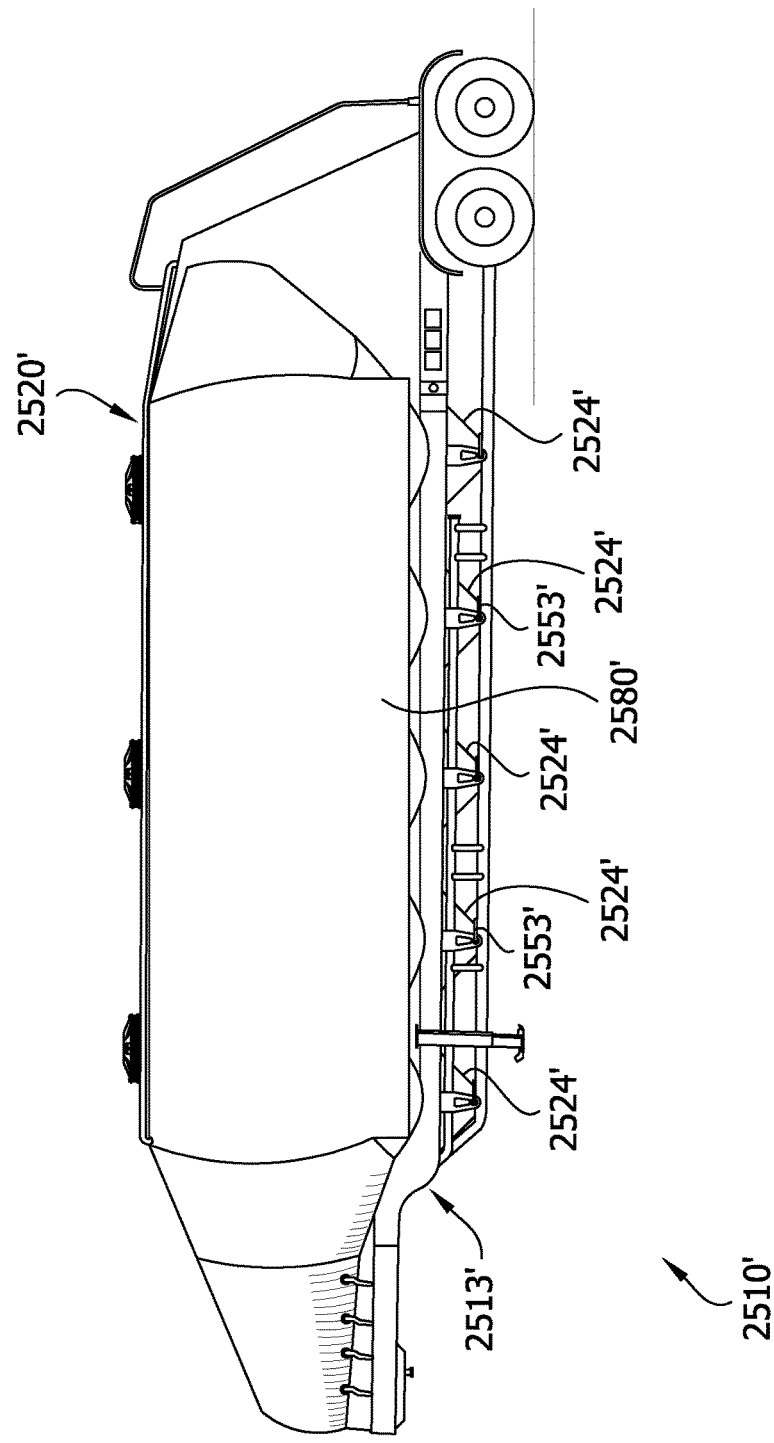
FIG. 30 is a side elevation of another embodiment of a pneumatic tank trailer.

Referring to FIG. 30, another embodiment of a pneumatic tank trailer is generally indicated at reference number 2510'. The pneumatic tank trailer 2510 is substantially similar to the pneumatic tank trailer 2510. Corresponding features of the pneumatic tank trailer 2510' are given the same reference number as corresponding features of the trailer 2510, plus a prime symbol. Whereas the tank wall 2530 of the trailer 2510 extends only as far downward as the upper edges of the hoppers 2524, the trailer 2510' includes skirts 2580' on each side of the tank 2520' (only the left side is shown in FIG. 30, but it is understood that the right side is a mirror image of the left side) that extends downward past the top edges of the hoppers 2524' on both sides of the tank 2520'. In one embodiment the skirts 2580' extend down to the frame 2513'. The skirts 2580' streamline the shape of the trailer 2510' adjacent the upper ends of the hoppers 2524'. The more streamlined shape is thought to reduce the turbulent air flow along the sides of the hoppers 2524', to reduce the drag coefficient of the trailer 2510' and thereby improve the fuel efficiency of vehicles pulling the trailer. To maximize the improvements the aerodynamics of the trailer 2510', it may be desirable for at least a rear end segment of the skirts 2580' to be angled inward. In the embodiment illustrated in FIG. 30, the skirts 2580' extend downward to cover an upper section of the hoppers 2524', but do not cover a lower section of the hoppers. As a result, a user of the hoppers 2524' can freely access the nozzle controls 2553'. Although the skirts 2580' are thought to improve the aerodynamics of the trailer 2510', it also increases the weight of the trailer as compared with the non-skirted trailer 2510. Rather than using the skirts 2580' that extend along the length of the trailer 2510', filler panels (not shown) may be attached in a flush, continuous manner to the tank 2520' and hoppers 2524' to from a generally smooth lower end of the trailer 2510'. To maximize the fuel efficiency gains of the skirts 2580', the skirts should be made from lightweight materials such as fiberglass, aluminum, plastic, and the like.

Figure 31:
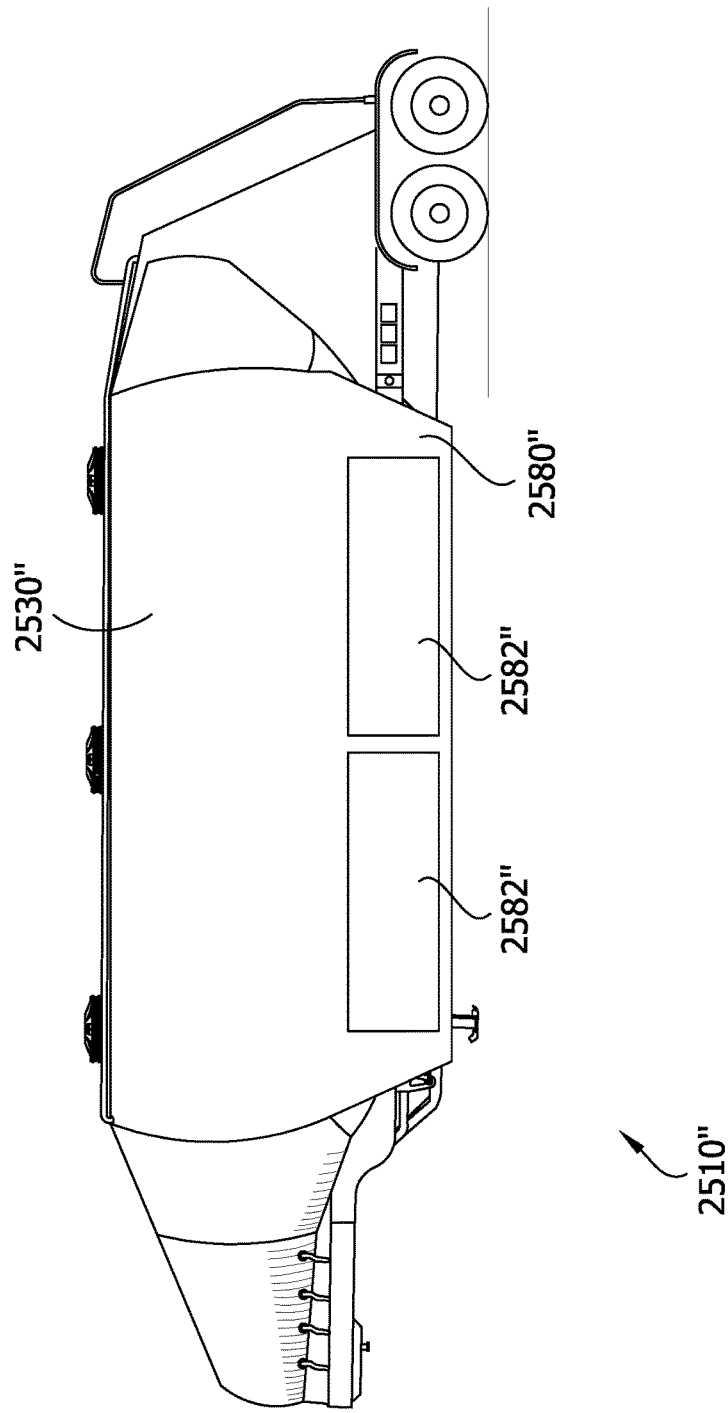
FIG. 31 is a side elevation of another embodiment of a pneumatic tank trailer.

Referring to FIG. 31, another embodiment of a pneumatic tank trailer is generally indicated at reference number 2510". The pneumatic tank trailer 2510" is substantially similar to the pneumatic tank trailer 2510. Corresponding features of the pneumatic tank trailer 2510" are given the same reference number as corresponding features of the trailer 2510, plus the double-prime symbol. Skirts 2580" are attached to the lower end of the tank wall 2530" to form lower side portions that extend downward to cover the hoppers (not shown) along substantially their entire heights. Even more than the skirts 2580', the skirts 2580" streamline the trailer 2510" to decrease the drag coefficient of the trailer. The improved aerodynamics are thought to improve the fuel efficiency of a tractor pulling the trailer 2510" as compared with a tractor pulling the trailer 2510 or the trailer 2510'. Since the skirts 2580" cover the hoppers, they also block access to the hoppers. To enable use of the hoppers, the controls can be moved to a more accessible location (e.g., near the rear of the trailer and/or at the nose portion of the trailer). The skirts 2580" can also include access doors 2582" to permit physical access to the hoppers. A user may selectively open and close the hopper doors 2582" to access the hoppers. The illustrated access doors 2582" open by swinging up. The access doors may also open by sliding in forward and rearward directions. It is also envisioned that the entire skirt 258" may swing up or slide for access.

Figure 32:
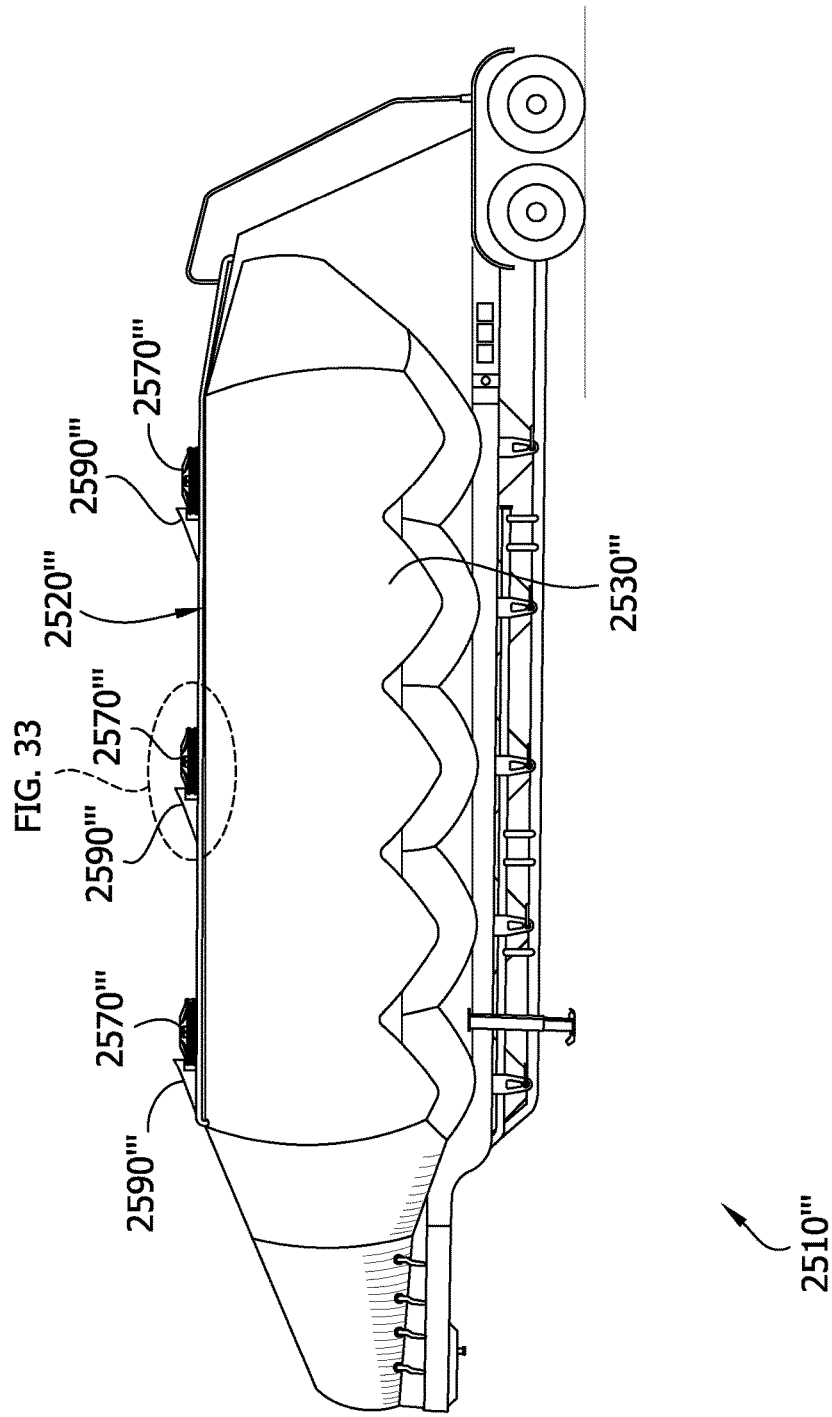
FIG. 32 is a side elevation of another embodiment of a pneumatic tank trailer.
Figure 33:
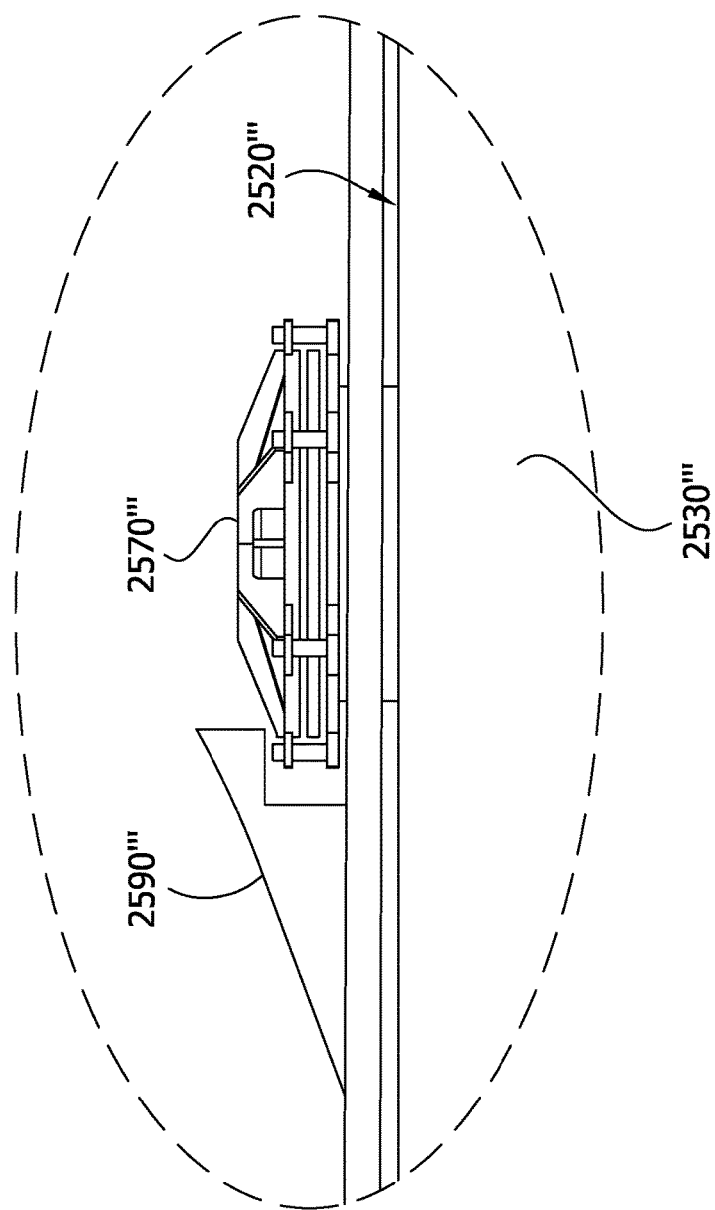
FIG. 33 is an enlarged view of a portion of FIG. 32.

Referring to FIGS. 32 and 33, another embodiment of a pneumatic tank trailer is generally indicated at reference number 2510'''. The pneumatic tank trailer 2510''' is substantially similar to the pneumatic tank trailer 2510. Corresponding features of the pneumatic tank trailer 2510' are given the same reference number as corresponding features of the trailer 2510, plus the triple-prime symbol. Because the manhole covers 2570''' extend outward from the top of the tank 2520', the manhole covers create drag on the trailer 2510'. To minimize the drag created by the manhole covers 2570''', the trailer 2510''' includes a streamlined shrouds 2590' (broadly, a streamlined body) positioned in front of each manhole cover. The streamlined shrouds 2590' have a lower drag coefficient than the manhole covers 2570'. The illustrated streamlined shrouds 2590''' slope gradually downward from the leading upper edge of the manhole covers 2570'''. Although the streamlined shrouds 2590' only cover the front end portions of each of the manhole covers 2570' in the illustrated embodiment, it will be understood that other embodiments can include streamlined shrouds that extend circumferentially around more of or the entire perimeter of each manhole cover (not shown) to further reduce the drag coefficient of the manhole covers. In addition, instead of using separate streamlined shroud 2590' for each of the manhole covers 2570''', the trailer could include a single streamlined shroud that extends around all of the manhole covers to lower the drag coefficient of the entire top surface of the tank 2520'''. Similarly, the manhole covers 2570' could be inset into the tank wall 2530''' so that the tops of the manhole covers are generally flush with the top of the tank wall. In still another embodiment, a single streamlined air deflector is positioned in front of the front-most manhole cover 2570" to deflect air upward over all of the manhole covers at highway speeds.

It should be understood from the foregoing that, while particular embodiments of the invention have been illustrated and described, various modifications can be made thereto without departing from the spirit and scope of the present invention. Therefore, it is not intended that the invention be limited by the specification; instead, the scope of the present invention is intended to be limited only by the appended claim.

What is claimed is:

1. A pneumatic tank trailer having a front end, a rear end, and a length extending between the front end and the rear end along a longitudinal axis of the trailer, the trailer comprising:
   a carriage for movement over a road;
   a tank defining a tank interior and including at least one hopper in fluid communication with the tank interior, the tank being configured to receive a fluidizable material in the interior and to selectively discharge the fluidizable material through the at least one hopper below the tank; and
   a nose portion having a rear end, a front end, a length extending between the rear and front ends along the longitudinal axis of the trailer, a top, and a width, the top of the nose portion having a continuous, arcuate surface,
the width of the nose portion tapering inward as the nose portion extends from the rear end to the front end,
the top of the nose portion sloping downward from the rear end at a skew angle relative to the longitudinal axis of the trailer,
the rear end of the nose portion having a cross-sectional center point and the front end of the nose portion having a cross-sectional center point, the cross-sectional center point of the front end being located below the cross-sectional center point of the rear end, and
the length of the nose portion being at least about 15% of the length of the trailer;
wherein the nose portion includes at least a front end segment having a maximum width along a length of the front end segment that generally lies in a maximum width plane oriented at a skew angle with respect to the longitudinal axis of the trailer; and
wherein the nose portion is free of external reinforcement.

2. A pneumatic tank trailer as set forth in claim 1 wherein the nose portion has a top surface that makes an angle with respect to a top surface of the trailer of from about 20° to about 25°.

3. A pneumatic tank trailer as set forth in claim 1 wherein the skew angle between the maximum width plane and the longitudinal axis of the trailer is from about 4° to about 10°.

4. A pneumatic tank trailer as set forth in claim 1 wherein the maximum width plane is oriented at a skew angle with respect to the top of the nose portion.

5. A pneumatic tank trailer as set forth in claim 4 wherein the skew angle between the maximum width plane and the top of the nose portion is from about 10° to about 18°.

6. A pneumatic tank trailer as set forth in claim 1 wherein the tank includes a front end portion which forms a rear segment of the nose portion.

7. A pneumatic tank trailer as set forth in claim 6 further comprising a nose covering separately attached to the front end portion of the tank and forming a front segment of the nose portion.

8. A pneumatic tank trailer as set forth in claim 7 wherein the front end portion of the tank is partially received in the nose covering.

9. A pneumatic tank trailer as set forth in claim 7 further comprising an unloading system, one or more components of the unloading system being received in the nose covering.

10. A pneumatic tank trailer as set forth in claim 9 wherein at least one control actuator that is operatively connected to the unloading system to control one or more aspects of the unloading system extends through a side of the nose covering.

11. A pneumatic tank trailer as set forth in claim 10 wherein the control actuator is accessible from an exterior of the trailer to selectively actuate said one or more aspects of the unloading system.

12. A pneumatic tank trailer as set forth in claim 1 wherein the nose portion includes an end cap defining the front end of the nose portion and the front end of the trailer.

13. A pneumatic tank trailer as set forth in claim 12 wherein the end cap is dome-shaped.

14. A pneumatic tank trailer as set forth in claim 1 further comprising a rear end portion having a front end, a rear end, a length extending between the front and rear ends along the longitudinal axis of the trailer, and a top.

15. A pneumatic tank trailer as set forth in claim 14 wherein the top of the rear end portion slopes generally down from the front at an angle of from about 5° to about 15° relative to the longitudinal axis of the trailer.

16. A pneumatic tank trailer as set forth in claim 14 wherein the rear end portion further comprises sides, the sides extending inward at an angle of from about 5° to about 15° relative to the longitudinal axis of the trailer.

17. A pneumatic tank trailer having a front end, a rear end, and a length extending between the front end and the rear end along a longitudinal axis of the trailer, the trailer comprising:
a carriage for movement over a road;
a tank defining a tank interior and including at least one hopper in fluid communication with the tank interior, the tank being configured to receive a fluidizable material in the interior and to selectively discharge the fluidizable material through the at least one hopper below the tank; and
a nose portion having a generally arcuate cross-sectional shape, a rear end, a front end, a length extending between the rear and front ends along the longitudinal axis of the trailer, a top, and a width,
the width of the nose portion tapering inward as the nose portion extends from the rear end to the front end,
the top of the nose portion sloping downward from the rear end at a skew angle relative to the longitudinal axis of the trailer,
the rear end of the nose portion having a cross-sectional center point and the front end of the nose portion having a cross-sectional center point, the cross-sectional center point of the front end being located below the cross-sectional center point of the rear end, and
the length of the nose portion being at least about 15% of the length of the trailer;
wherein the nose portion includes at least a front end segment having a maximum width along a length of the front end segment that generally lies in a maximum width plane oriented at a skew angle with respect to the longitudinal axis of the trailer and oriented at a skew angle with respect to the top of the nose portion; and
wherein the skew angle between the maximum width plane and the top of the nose portion is from about 10° to about 18°.

18. A pneumatic tank trailer having a front end, a rear end, and a length extending between the front end and the rear end along a longitudinal axis of the trailer, the trailer comprising:
a carriage for movement over a road;
a tank defining a tank interior and including at least one hopper in fluid communication with the tank interior, the tank being configured to receive a fluidizable material in the interior and to selectively discharge the fluidizable material through the at least one hopper below the tank; and
a nose portion having a generally arcuate cross-sectional shape, a rear end, a front end, a length extending between the rear and front ends along the longitudinal axis of the trailer, a top, and a width,
the width of the nose portion tapering inward as the nose portion extends from the rear end to the front end,
the top of the nose portion sloping downward from the rear end at a skew angle relative to the longitudinal axis of the trailer, the rear end of the nose portion having a cross-sectional center point and the front end of the nose portion having a cross-sectional center point, the cross-sectional center point of the front end being located below the cross-sectional center point of the rear end, and the length of the nose portion being at least about 15% of the length of the trailer;

wherein the tank includes a front end portion which forms a rear segment of the nose portion.

* * * * *